(12) United States Patent
Ladvocat Cintra

(10) Patent No.: US 11,568,233 B2
(45) Date of Patent: Jan. 31, 2023

(54) TECHNIQUES FOR PROCESSING RECORDED DATA USING DOCKED RECORDING DEVICES

(71) Applicant: Axon Enterprise Inc., Scottsdale, AZ (US)

(72) Inventor: Daniel Ladvocat Cintra, Brooklyn, NY (US)

(73) Assignee: Axon Enterprise Inc., Scottsdale, AZ (US)

( * ) Notice: Subject to any disclaimer, the term of this patent is extended or adjusted under 35 U.S.C. 154(b) by 661 days.

(21) Appl. No.: 16/150,108

(22) Filed: Oct. 2, 2018

(65) Prior Publication Data

US 2020/0104698 A1 Apr. 2, 2020

(51) Int. Cl.
*G06N 3/08* (2006.01)
*H04N 7/18* (2006.01)
*H04N 5/77* (2006.01)
*G06F 1/16* (2006.01)

(52) U.S. Cl.
CPC ............. *G06N 3/08* (2013.01); *G06F 1/1632* (2013.01); *H04N 5/772* (2013.01); *H04N 7/185* (2013.01)

(58) Field of Classification Search
CPC ....................................................... G06N 3/08
See application file for complete search history.

(56) References Cited

U.S. PATENT DOCUMENTS

| 5,625,829 | A | 4/1997 | Gephardt et al. |
| 6,309,230 | B2 | 10/2001 | Helot |
| 8,463,025 | B2 | 6/2013 | Melvin et al. |
| 8,564,683 | B2 | 10/2013 | Easwar et al. |
| 9,578,134 | B2 | 2/2017 | Wu et al. |
| 2004/0233282 | A1* | 11/2004 | Stavely ............ G08B 13/19669 348/143 |
| 2013/0311694 | A1 | 11/2013 | Bhamidipati et al. |
| 2016/0217387 | A1 | 7/2016 | Okanohara et al. |
| 2019/0019036 | A1* | 1/2019 | Yoo ...................... G06N 3/0445 |

FOREIGN PATENT DOCUMENTS

| WO | 2012083484 A1 | 6/2012 |
| WO | 2016199192 A1 | 12/2016 |

* cited by examiner

*Primary Examiner* — Daniel T Tekle
(74) *Attorney, Agent, or Firm* — Andrew Graham; Carmel Zhao

(57) ABSTRACT

Various embodiments of the present disclosure increase the technical utility of a recording device and local recording device system by enabling a recording device to use a machine learning model to process media content received from a separate recording device. This allows a machine learning model to be used to process media content at a local system without a remote network connection or independent of whether a remote computing system is available over a network connection. Many embodiments eliminate the need for a separate computing device altogether for purposes of using a machine learning model. Embodiments of the present disclosure also decrease the time required to complete processing of a media file by processing the media file in parallel among multiple recording devices and/or by eliminating time associated with uploading a media file to cloud-based system and receiving one or more output values back from the cloud-based system.

20 Claims, 8 Drawing Sheets

TECHNIQUES FOR PROCESSING RECORDED DATA USING DOCKED RECORDING DEVICES

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a distributed processing system is provided. The distributed processing system comprises a dock, a first recording device, and a second recording device. The first recording device and second recording device are removably coupled to the dock. The first recording device includes a first sensor, a first memory storing media content captured via the first sensor, and a first processor configured to transmit a first portion of the media content from the first recording device via the dock. The second recording device includes a second sensor, a second memory storing a first machine learning model, and a second processor configured to receive the first portion of the media content via the dock from the first recording device, and to process the received first portion of the media content using the first machine learning model.

In some embodiments, a media recording device is provided. The media recording device comprises a sensor operable to capture first media content, a memory storing a machine learning model and operable to store the first media content; and a processor. The processor is configured to receive second media content via a dock from a second media recording device; process the second media content using the machine learning model to generate metadata; and transmit the metadata from the media recording device via the dock.

In some embodiments, a method of processing media content in a recording device is provided. First media content is captured with a sensor of the recording device. The first media content is stored in a memory of the recording device. A machine learning model is stored in the memory of the recording device. Second media content is received from a separate recording device. The second media content is processed using the machine learning model using a processor of the recording device to generate metadata. The metadata is transmitted to the separate recording device.

In some embodiments, a method of processing media content in a recording device is provided. Media content is captured via a first sensor of the recording device. The media content is stored in a first memory of the recording device. A first portion of the media content is transmitted from the recording device to a first separate recording device for processing using a machine learning model stored on the first separate recording device. Metadata associated with the first portion of the media content is received from the first separate recording device.

In some embodiments, a media recording device is provided. The media recording device comprises a sensor operable to capture media content, a memory operable to store the media content, and a processor. The processor is configured to transmit a first portion of the media content from the recording device to a first separate media recording device for processing using a machine learning model stored on the first separate media recording device, and receive metadata associated with the first portion of the media content from the first separate media recording device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
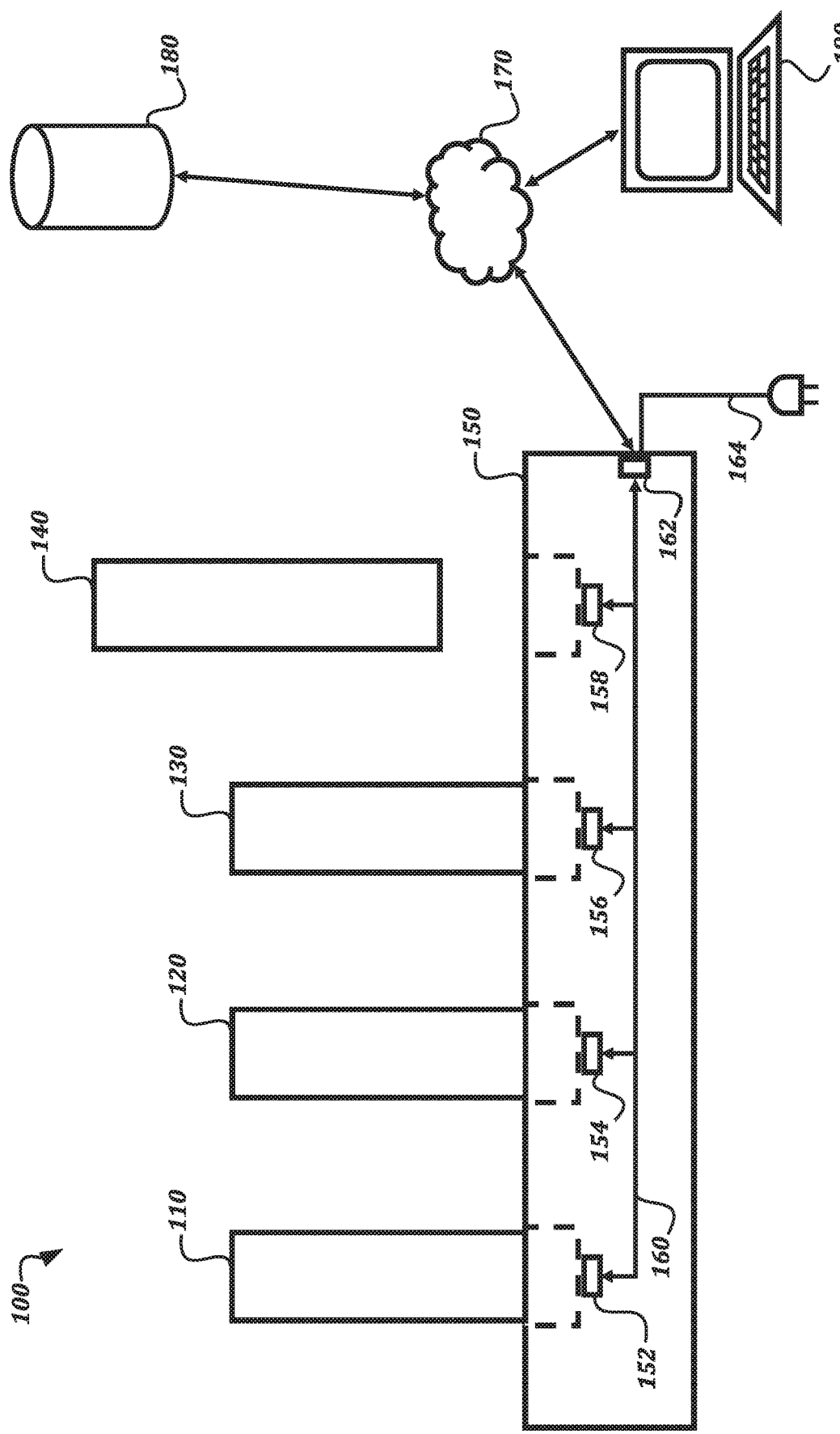
FIG. 1 is a schematic diagram of an example embodiment of a system for processing media content according to various aspects of the present disclosure.

Police officers use recording devices to record events as they occur at an incident. Recording devices may include still cameras, video cameras, body-worn cameras (or "bodycams"), vehicular cameras, infrared cameras, audio recorders, biometric recorders, and digital motion recorders for example. Each device can be deployed and available for use for a given period of time. This period of time may correspond to a work shift, such as a period of eight or ten hours. Other durations are possible, including those that are uninterrupted and those that extend beyond a predetermined period of time.

After a work shift or other period of time, a recording device is then coupled to a dock to recharge and/or upload one or more media files generated during the work shift. A police officer, police department or other organization may have multiple such recording devices. These devices may be coupled to a same physical dock. The dock may provide power to a coupled recording device. This power may recharge a battery of the recording device. The dock may also provide a wired or wireless internet connection through which a media file on a coupled recording device may be uploaded to a separate computing system, such as a local or remote database. After a recording device uploads recorded files and/or a battery of the recording device is recharged, a processor of the recording device may remain idle. The recording device and its processor may remain idle and unused until the recording device is removed or otherwise decoupled from the dock.

Various machine learning models may be used to process a media file. Such models may determine particular classifications, identify depicted objects or determine other output data based on media content of the media file. One issue associated with using a machine learning model is that some models are large. For example, a machine learning model can require more than 1 GB of storage space just for storage of the model itself. Using a machine learning model can also be resource intensive, needing extensive processing cycles from a processor and power from a battery. A machine learning model can also run slowly due to a limited amount of random access memory (RAM) available on a device.

These issues inhibit such machine learning models from being used by recording devices, where the technical environment requires storage space to be reserved for media files. This technical environment also requires resources such as a processor and battery to be available for generating new media files. In a law enforcement setting, these issues are further complicated by the existence of only limited time periods between shifts or other periods of use in which recording device resources may be available for tasks other than uploading media filed or recharging a battery. A recording device by itself may have insufficient time to apply a machine learning model to an entire media file. Yet, decreasing the time between the generation of a media file and the extraction of valuable information remains desirable, including for reasons of overall system speed and effectiveness, as well as reasons related to public safety.

One solution for processing a media file using a machine learning model would be to upload the media file from a recording device to a server in a cloud-computing environment with better hardware, and then processing the media file on this separate, remote machine. However, this solution requires additional hardware associated with the remote server and cloud-based system, as well as intermediate networking equipment. A network connection to a remote machine may also be unavailable or unreliable in remote locations or places experiencing adverse weather conditions or other sources of network outages. This solution also fails to make full use of resources that are already available at a location, such as those provided in other recording devices.

Embodiments of the present disclosure address and overcome these technical shortcomings. Particularly, various embodiments increase the technical utility of a recording device and local recording device system by enabling a recording device to use a machine learning model to process media content received from a separate recording device. This allows a machine learning model to be used at a local system without a remote network connection or independent of whether a remote computing system is available over a network connection. Many embodiments eliminate the need for a separate computing device altogether for purposes of using a machine learning model. Embodiments of the present disclosure also decrease the time required to complete processing of a media file by processing the media file in parallel among multiple recording devices and/or by eliminating time associated with uploading a media file to cloud-based system and receiving one or more output values back from the cloud-based system.

FIG. 1 is a schematic diagram of an example embodiment of a system for processing media content according to various aspects of the present disclosure. Distributed processing system 100 includes four recording devices 110, 120, 130, and 140; physical dock 150; network 170; a remote storage device 180 and a computing device 190. The devices, relative arrangements, and/or interconnections of these devices in this illustration are provided for illustrative purposes only and should not be construed as limiting. Other implementations of the present invention may include fewer devices, additional devices, different types of devices, subsets of these devices, as well as fewer, alternate, or additional interconnections. Implementations may also exclude and/or be provided independent of certain devices, components, and/or steps as shown herein. For example, different remote computing devices may be provided with or instead of remote storage device 180. Multiple databases and other types of storage devices may be provided in addition to or instead of remote storage device 180. The remote storage device 180 may also include one or more servers to connect a storage device to network 170. Similarly, a system may not include computing device 190. Alternately, two or more computers 190, including those that are connected to dock and/or remote storage device 180 via additional and/or separate networks 170, may be provided.

Dock 150 includes bays for recording devices, such as recording device 110, recording device 120, recording device 130 and recording device 140. In the illustrated embodiment, dock 150 includes physical bays that are sized and shaped to physically support each recording device 110, 120, 130, and 140. As illustrated in FIG. 1, the bays have a cavity or recessed shape, but other shapes and manners of mounting the recording devices on the dock are possible. Alternate or additional shapes and sizes are possible, including those with fewer sides, more sides, and/or alternate shapes. Different manners of retention may also be provided, including those that involve magnets positioned in a complementary manner between dock 150 and a recording device such as device 110. In some embodiments, lateral retention surfaces may not be provided and a recording device such as device 110 may be retained largely or entirely upon dock 150 through gravitational force.

Four bays for recording devices 110, 120, 130, 140 are illustrated in FIG. 1; however, other numbers of bays may be provided, including those ranging from two to twelve bays or two to twenty-four bays per dock. A bay may be provided for each recording device 110, 120, 130, and 140. Alternately, fewer or more bays may be provided relative to an overall number of recording devices included in embodiments of the present disclosure. The bays may have a particular, asymmetrical shape so as to permit the recording devices 110, 120, 130, 140 to be inserted therein when oriented in a particular manner. In such embodiments, the recording devices 110, 120, 130, 140 may also have a corresponding shape, such that they may only be inserted into a bay with a predetermined orientation.

The dock 150 includes a bus 160. The bus 160 is illustrated as a wired, physical connection between each bay and one end of the dock 150. The bus includes at least one physical connector 152 for recording device 110, at least one physical connector 154 for recording device 120, at least one physical connector 156 for recording device 130, and at least one physical connector 158 for recording device 140. Each connector may be different, selected to correspond to a specific recording device or type of recording device (e.g., a specific model of bodycam). Alternately, one or connectors on dock 150 may be of a same design, such that connector 152 and one or more of connector 154, connector 156, and connector 158 are operable to couple with recording device 110. Bus 160 also includes at least one external connection 162. This connector 162 may be positioned at one end of dock 150 or, alternatively, variably positioned at a number of different physical locations on dock 150.

The external connector 162 may include a Universal Serial Bus (USB) connector, a 2.5 mm socket, and/or other types of connectors. In some embodiments, the external connector may also include one or more wireless connectors, such as a wireless transmitter and/or receiver. A wireless connector may be implemented according to various wireless protocols, such as WiFi, 2G, 3G, 4G, LTE, WiMAX, Bluetooth, and/or the like. External connector 162 may also include a physical connector for receiving electrical power from an external power supply, such as a socket for coupling with electrical power cord 164.

Similarly, connectors 152, 154, 156, and 158 may each respectively include a 2.5 mm plug, USB connector, and/or other type of connector adapted to physically connect with a recording device 110, 120, 130, or 140 and provide electrical communication between a respective recording device 110, 120, 130, 140 and the bus 160. The connectors 152, 154, 156, 158 may physically extend into the bay for each respective camera. Each of the connectors 152, 154, 156, 158 may also be non-symmetrical in shape, thereby permitting a recording device to be inserted into a respective bay in a limited, predetermined manner. For one or more connectors, such as when connector 152 includes a pin plug, the relative location of the connector(s) within each bay may also be provided in a manner that only permits a recording device to be inserted and/or form an electrical connection when the recording device is provided in a particular orientation. In some embodiments, one or more of the connectors 152, 154, 156, and 158 may include a cord. In embodiments involving a cord, the dock 150 and a recording device such as device 156 may be electrically interconnected via the connector without requiring the device 156 to be positioned physically adjacent the dock 150.

As illustrated, recording device 140 is physically separated and not in communication with connector 158 in FIG. 1, while the other recording devices 110, 120, and 130 are in physical contact and electrical communication with respective connectors 152, 154, 156. In such an arrangement the recording devices 110, 120, and 130 are docked with dock 150, while recording device 140 is undocked. Connectors 152, 154, 156, and 158 may be a same or different type of connector, each permitting a recording device to be selectively and removably coupled therefrom. Each connector 152, 154, 156, and 158 may also be variably and selectively coupled to each of recording devices 110, 120, 130, and 140. For example, recording device 110 may be alternately inserted into the bay associated with connector 156 when connector 152 is the same as connector 156. In many embodiments, connectors 152, 154, 156, and 158 enable communication via wired electrical signals, though other manners of connection may also or alternately be used, including radio frequency, infrared, serial, parallel, Bluetooth, USB, and/or other suitable connection protocols using wireless or physical connections. Use of a wireless connector may enable a device, such as recording device 140 to be coupled to dock 150, even when device 140 is not physically coupled to dock, not in electrical communication with dock 150, or not electrically connected to dock 150 in a way that permits exchange of data with dock 150. A recording device may be coupled to dock 150 via a wireless connector of the dock 150 when a communication channel is established between the dock 150 and the recording device and both the recording device and the dock 150 are enabled to transfer data via the communication channel upon initiation of such a data transfer by either the recording device or the dock 150. In such embodiments, the recording device and/or the dock 150 may further detect whether the communication channel is established and initiate the setup of such a channel when such a communication channel is not established. Other embodiments may require that such a recording device be physically coupled to dock or electrically connected to dock 150 in order to be coupled to dock 150, independent of whether data is subsequently transferred in a wired or wireless manner. Embodiments of the disclosed system may include or exclude wired or wireless manners of communication between a recording device and a connector of the dock 150.

The bus 160 may provide power to one or more of the recording devices 110, 120, 130, 140. The power may be received from an external source, such as a wall outlet via an electrical power cord 164 with a plug as is known in the art. In some embodiments, the dock 150 may include a transformer (not shown) to convert the power from an external source into that which is suitable for a recording device. The power also may be received via other types of external sources, such as a separate, external USB power source, such as a USB port (not shown) on computing device 190. In some embodiments, the power source may also include an internal source, such as a backup battery, integrated within the dock 150 itself and selectively coupled to bus 160 if power is not detected on bus 160. For example, the bus 160 may provide approximately 5 volts of electrical power to each bay in the dock 150 for receipt by a corresponding recording device. Power may be provided to recording devices 110, 120, 130 via a wired electrical connection in bus 160.

The bus 160 may also provide a communication path between the recording devices 110, 120, 130, and 140. The communication path may also connect with an external device via connector 162. In many embodiments, the bus is an electrical bus, conveying electrical signals between connected elements; however, other types of physical components and mixtures of component types are possible (e.g., electrical wires and optical fiber). One or more of the communication paths between recording devices 110, 120, 130, or 140 may be provided via a wired electrical connection in bus 160. One or more of the communication paths between recording devices 110, 120, 130, or 140 may be provided via a wired optical connection in bus 160. While illustrated as a single element in FIG. 1, embodiments of the bus 160 may include multiple wires. Multiple wires may be used for separate functions, such as communication on a first wire or set of wires and power supply on a second wire or set of wires. Such wires may constitute two separate buses, such as a power supply bus and a communications bus, relative to the function their main or sole function within dock 150. For transmitting and receiving data, additional buses may be employed to interconnect a bay and corresponding connector, such as connector 152, to the external connecter 162. For transmitting and receiving data, additional buses may be employed to interconnect connectors for two or more bays, such as a separate bus between connector 152 and 154 or between connector 155 and connector 158. For a communications bus, alternate types of connections may be provided, aside from wires, including wire optical connections as noted above.

Communication across bus 160 may be implemented in various manners. For example, bus 160 may be a serial bus or a parallel bus. Various network topologies may be used to interconnect a recording device in a first bay with a camera in another bay. For example, connection between bays may be made according to a multidrop, daisy-chain, and/or star network topology. Alternately or additionally, one or more of the buses and/or connectors may be implemented using a switched hub in the dock 150. The buses and connectors may also or alternately be configured in accordance with a Universal Serial Bus (USB) protocol. The physical elements and communication standard implemented between bays, such as between connectors 152 and 154 may be different from the elements and standard used to connect a connector such as connector 152 and the external connector 162. The bus 160 may also be configured to permit a recording device, such as a device 110 to detect whether a second device, such as device 140, is coupled to dock 150. Such detection may be based on an impedance provided within the bus 160 relative to two end points. Such detection may also involve transmission and response or other predetermined signal(s) between two end points, indicating that a second recording device is coupled for logical communication with a first recording device.

The external connector 162 may comprise one or more physical connectors. In many embodiments, connector 162 includes at least a data connector and a power supply connector. A power supply connector may connect to physical power cord 164 for a wall outlet as shown in FIG. 1. The power supply connector may include a socket-type connector. A corresponding plug for cord 164 may include a plug adapted to fit a matching socket-type connector on the dock and may further include an integrated transformer between the plug and one or more prongs at an opposite end of power cord 164. The relative device on which the socket-type connector and plug are provided may also be reversed between the connector 162 and the cord 164. Other types of connectors may also be employed, including those that maintain electrical contact between connector 162 and cord 164 via magnetic elements or mechanical clamp-type elements.

A data connector of external connector 162 may comprise one or more of a USB-type connector, an Ethernet connector, a wide area network connector, a local area network connector, and/or other types of connectors. One or more such data connectors may couple to network 170. Network 170 may include one or more of a cellular network, a WiFi network, a cellular network, a local area network (LAN), a wide area network (WAN), and/or any other network. Such a network or networks 170 may provide a bidirectional communication path between dock 150 and a remote storage device 180. The network 170 may also connect the dock via connector 162 to a computing device 190. The network 170 may include separate networks to interconnect the dock 150 and remote storage device 180 as well as dock 150 and computing device 190. For example, dock 150 may connect to computing device 190 via a USB connection or Ethernet-based LAN connection, while dock 150 may concurrently connect to remote storage device 180 via an Ethernet-based WAN connection. Computing device 190 may also connect to remote storage device 180 via network 170, which may be a same or separate network used by the dock 150 or device 180 for other communication. Other network connections and combinations of network connections are possible, including those that provide a wireless communication path between dock 150 and a physically separate device. Other possible manners of connection include those that involve both wired and wireless connections, such as wireless connection between dock 150 and a router in network 170, where the router is then further connected to remote storage device 180 via a wired connection.

In some embodiments, the external connector 162 may include a connector that serves as both a data connector and a power supply connector. For example, a USB-type connector or an Ethernet connector configured for power-over-Ethernet (PoE) may provide both power and data connectivity to the dock 150.

As noted above, recording devices 110, 120, 130, and 140 are data source devices, each respectively involved with creation of its own media file. As noted above, the devices may each be one or more of a still camera, video camera, bodycam, vehicular camera, infrared camera, and digital audio recorders. The recording device may capture input audio, video, or other types of input signals, record the input signals in a digital format, and generate a media file that includes the captured and recorded input signal(s) along with other data. A discussion of components in a recording device such as device 110 is further presented below with respect to FIG. 2.

Media files may be transferred from a data source device, such as recording device 110, to a repository device, such as remote storage device 180 and/or computing device 190. In accordance with embodiments of the invention, remote storage device 180 and/or computing device 190 may include one or more of a server, personal computer, mobile phone, smart phone, tablet computer, embedded computing device, and other computing device(s) configured for use in accordance with embodiments of the present disclosure.

In its most basic configuration, a repository device such as storage device 180 and computing device 190 each include at least one processor interconnected with a system memory. The system memory may be one or more of a volatile or nonvolatile memory, such as read only memory ("ROM"), random access memory ("RAM"), EEPROM, flash memory, or other memory technology. Such system memory typically stores data and/or program modules that are immediately accessible to and/or currently being operated on by the processor. In this regard, the processor may serve as a computational center of the repository device by supporting the execution of instructions.

A repository device such as remote storage device 180 or computing device 190 may further include a network interface that enables communication over network 170 with other devices, such as a dock 150. Such communication may be performed using various protocols, including but not limited to Ethernet protocols, USB protocols, and/or wireless communication protocols, such as WiFi, 2G, 3G, 4G, LTE, WiMAX, Bluetooth, and/or the like.

Repository devices such as remote storage device 180 and/or computing device 190 may also include a local storage medium, enabling persistent data storage. The local storage medium may be volatile or nonvolatile, removable or nonremovable, implemented using any technology capable of storing information such as, but not limited to, a hard drive, solid state drive, CD ROM, DVD, or other disk storage, magnetic tape, magnetic disk storage, and/or the like. Such local storage medium may be configured to store numerous media files, including those received via one or more docks and/or one or more data source devices which may be coupled across multiple docks. The repository devices may further receive and store original media files, annotated media files, and/or content metadata as further discussed below. One or more repository devices, such as computing device 190, may be located in a same physical location as the dock 150. The same physical location may include the same room inside a building or a different room inside the same building.

Other repository devices, such as remote storage device 180, may be remotely physically located. A remote repository device such as device 180 may be part of a cloud computing system in contact with dock 150 and/or computing device 190 via the Internet. A remote storage device may be located in a separate building from a dock. For example, remote storage device 180 may also located at a central office of an agency, such as a headquarters of a state agency, while the dock 150 and/or computer 190 may be located at a district office of the same state agency. While FIG. 1 illustrates a single computing device 190 and a single remote storage device 180, one of ordinary skill in the art will appreciate that multiple such devices may be available and included in embodiments of the present invention.

In many embodiments, remote storage device 180 and/or multiple such devices may form a data store for media files recorded by recording devices such as devices 110, 120, 130, and 140. As understood by one of ordinary skill in the art, a "data store" may be any suitable device configured to store data for access by a computing device. A data store receives data. A data store retains (e.g., stores) data. A data store retrieves data. A data store provides data for use by a system, such as an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database.

One example of a data store suitable for use with the high capacity needs of an evidence management system is a highly reliable, high-speed relational database management system ("RDBMS") executing on one or more computing devices and accessible over a high-speed network. However, any other suitable storage technique and/or device capable of quickly and reliably providing the stored data in response to queries may be used, such as a key-value store and an object database.

Figure 2:
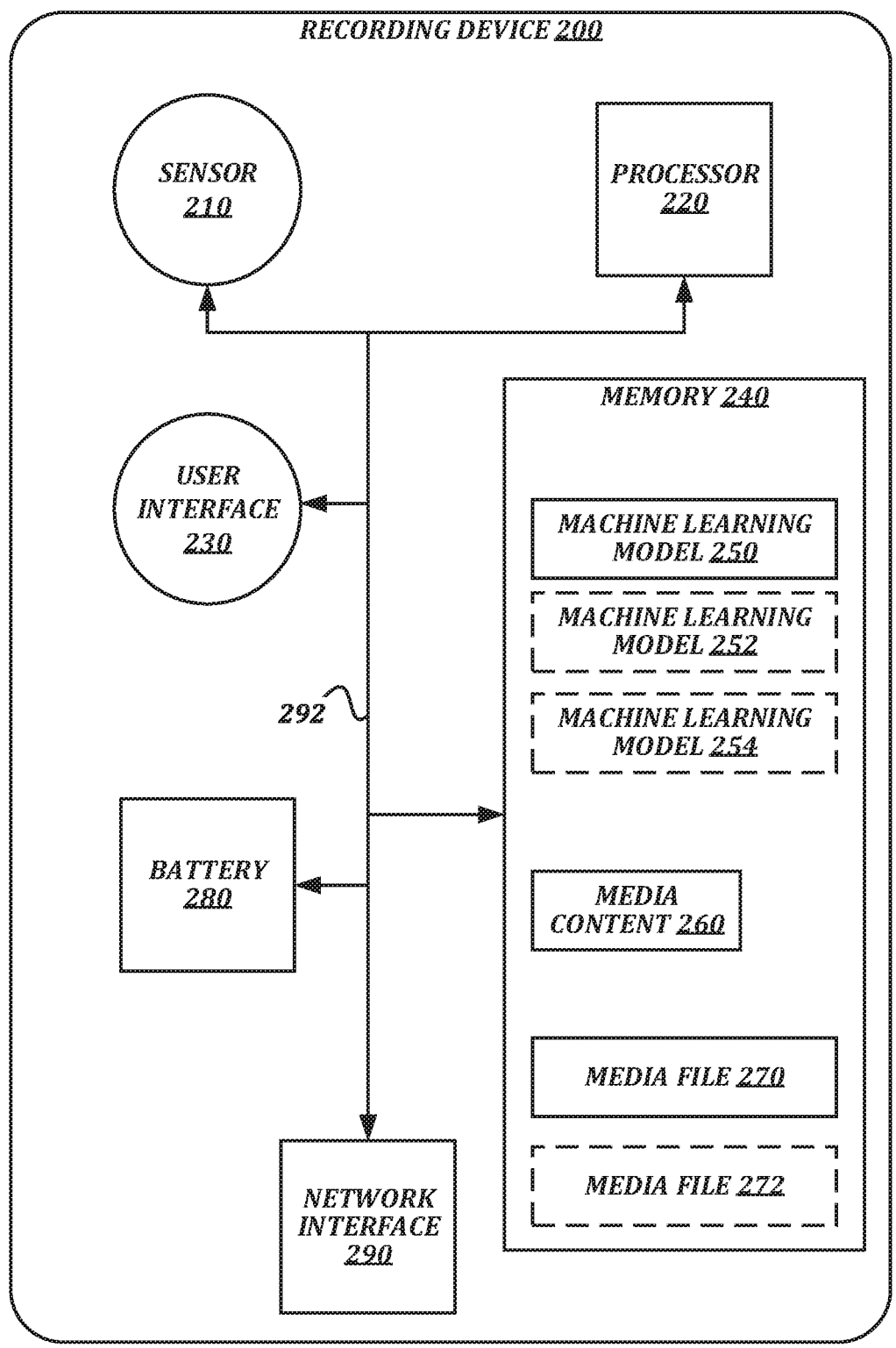
FIG. 2 is a schematic diagram of an example embodiment of a recording device according to various aspects of the present disclosure.

Recording device 200 is an example data source device, shown in FIG. 2. Recording device 200 may correspond to one or more of recording devices 110, 120, 130, and 140. In many embodiments, a recording device 200 of the present invention includes at least the components shown in FIG. 2, though some embodiments may include other components, including multiple of the components shown in FIG. 2. The components of FIG. 2 and related description below are applicable to various types of recording devices, including a camera, video camera, bodycam, vehicular camera, infrared camera, digital audio recorders, mobile phone, smartphone, tablet computer, motion wearable, biometric wearable, or other mobile computing device. Some embodiments may also include dash-mounted or other vehicle-mounted cameras, which may be selectively removed from a vehicle and coupled to a dock such as dock 150.

Recording device 200 includes at least one sensor 210. In many embodiments, sensor 210 will include at least one of an image sensor and an audio transducer. Alternate sensors may also include one or more motion sensors, biometric sensors, and position sensors. Motion sensors may include gyroscopes and/or accelerometers. A heart rate sensor is an example type of biometric sensor. Example position sensors include global positioning sensors (GPS) and other relative location detection components. Image sensors may include one or more lenses or other optical elements and an electronic sensor. The electronic sensor may include a charge coupled device (CCD), a complementary metal-oxide-semiconductor (CMOS) sensor, or other component that converts optical signals into one or more electrical signals. An audio transducer may include a one or more microphones, operable to convert an audible mechanical wave into one or more electrical signals.

The electrical signal generated from each such sensor may comprise a digitized value or values associated with the sensor 210. For example, the electrical signal output by an image sensor may include a series of pixel values captured at a given point in time. The electrical signal output by an audio sensor may include an amplitude value of an input audio signal captured at a given point in time. The electrical signal from a heart rate sensor may include an amplitude value associated with a heart beat at a given point in time. An electrical signal from a position sensor may include an absolute location value or a relative location value captured at a given point in time. An electrical signal from a motion sensor may include an acceleration value, speed value, or other motion-related value detected at a given point in time. A sensor 210 may also generate multiple such signals in parallel. A sensor 210 may also generate a sequence of such values, such as a series of amplitude values captured based on an input audio signal. A sequence of values may also include pixel values associated with an image or a series of images. The electrical signals may be provided to processor 220 for further processing.

In many embodiments, sensor 210 is positioned on an outer surface of a housing for recording device 200, thereby enabling signals related to an incident to be received by the sensor and converted into corresponding electrical signals. As noted above, the signals related to an incident may be one or more an optical signal, audio signal, motion signal, biometric signal, or other signal present in an environment, which can be captured via sensor 210. In some embodiments, a sensor 210 may be positioned in a separate housing from other components of the recording device 200. For example, some cameras may include a first housing with a sensor 210, while other components of the recording device 200 are positioned in a second, separate housing. The two housings may be interconnected through a wire or other form of electrical cable. Alternately or additionally, the two housings may be coupled via a wireless connection, such as a wireless connection in accordance with the Bluetooth protocol. The first housing may be adapted to be securely mounted on a pair of glasses or a shoulder of a user, while the second housing is adapted to be securely mounted on a shirt, belt, pocket, or other location on a user's clothing. Other numbers of housings are possible for recording device 200, including additional housings for another sensor 210 and or other components, such as user interface 230, memory 240, and/or battery 280. Electrical signals from the sensor 210 may be transferred to a processor 220 or memory 240 via a bus 292.

Processor 220 includes any circuitry and/or electrical/electronic subsystem for performing a function. Processor 220 may include circuitry that performs (e.g., executes) a stored program. Processor 220 may include one or more of a digital signal processor, a central processing unit, a microcontroller, a microprocessor, an application specific integrated circuit, a programmable logic device, a field programmable gate array, logic circuitry, state machines, MEMS devices, signal conditioning circuitry, communication circuitry, data busses, address busses, and/or a combination thereof in any quantity suitable for performing a function and/or executing one or more stored programs.

In embodiments, processor 220 may include a graphics processing unit (GPU). A GPU may allow particularly efficient processing of signals from sensor 210 that involve a captured optical or visual signal that is further formatted into images or frames. A GPU may provide various benefits and advantages when processing an image or frame, including accelerated calculations for processing a machine learning model such as model 250. Processor 220 may alternately or additionally include different hardware processors for computations, including tensor processing units (TPUs) and/or other accelerator application-specific integrated circuits.

Processor 220 may further include conventional passive electronic devices (e.g., resistors, capacitors, inductors) and/ or active electronic devices (e.g., op amps, comparators, analog-to-digital converters, digital-to-analog converters, programmable logic). Processor 220 may include conventional data buses, output ports, input ports, timers, memory, and arithmetic units.

Processor 220 may provide and/or receive electrical signals whether digital and/or analog in form. For example, processor 220 may receive a digital or analog sensor signal from sensor 210, the sensor signal corresponding to an external signal captured by sensor 210. Processor 220 may provide and/or receive digital information via a conventional bus using any conventional protocol. Processor 220 may receive information, manipulate the received information, and provide the manipulated information. Processor 220 may store information and retrieve stored information. Information received, stored, and/or manipulated by the processor 220 may be used to perform a function and/or to perform a stored program.

Processor 220 may control the operation and/or function of other circuits and/or components of a system. As shown in FIG. 2, processor 220 is in electrical communication with each of the other components of recording device, thereby enabling such control. Processor 220 may receive data from other circuits and/or components of a device or system, including those shown in FIG. 2. Processor 220 may receive status information from and/or regarding the operation of other components of a system.

Processor 220 may perform one or more operations, perform one or more calculations, provide commands (e.g., instructions, signals) to one or more other components responsive to data and/or status information. A command provided to a component may instruct the component to start operation, continue operation, alter operation, suspend operation, and/or cease operation. Commands and/or status may be communicated between processor 220 and other circuits and/or components via any type of bus including any type of conventional data/address bus.

In some embodiments, the user interface 230 may include one or more devices through which a user may interact with the recording device 200, provide commands to components of the recording device 200, and/or view information generated by a component of the recording device 200. Some non-limiting examples of devices that may be included in the user interface 230 include push buttons, toggle switches, touch-sensitive devices, motion sensors, and microphones. The user interface 230 may also include output devices, such as displays and output transducers. For example, user interface 230 may include one or more of a liquid crystal display, a vibration motor, and a speaker.

In some embodiments, the battery 280 is configured to provide power to the other components of the recording device 200. The battery 280 may also be configured to provide battery status information to at least the processor 220, so that the processor 220 may make decisions based on a level of charge of the battery 280. In some embodiments, the battery 280 may be recharged by coupling the recording device 200 to a source of power, such as a connector of dock 150 as discussed above in the context of FIG. 1.

In some embodiments, the network interface 290 is configured to provide communication connectivity between the recording device 200 and other devices of the system 100. In some embodiments, the network interface 290 may communicatively couple the recording device 200 to the dock 150, and the dock 150 may provide further communicative connectivity between the recording device 200 and other devices. In some embodiments, the network interface 290 may include a physical connector. In some embodiments, the network interface 290 may be combined with a power connector that can be used to provide power to the components of the recording device 200 and charge the battery 280. Some non-limiting examples of suitable technologies implemented by the network interface 290 for communication and/or power include USB 2.0, USB 3.0, USB 3.0 and Ethernet. Alternately or additionally, the network interface 290 may include a socket with multiple electrical contacts, each contact configured to serve a different function for the recording device. For example, the socket may include a first contact for receiving electrical power to recharge battery 280 and a second contact for transmitting electrical signals between processor 220 and an external device, including other recording devices coupled to a common dock 150. Additional or fewer contacts are also possible for such a socket. A plug or pin may also be provided in place of the socket. A plug or pin type connector may also be substituted for other connector types discussed above, while still permitting the same functionality to be performed by the recording device 200. The network interface 290, in some embodiments, may also include separate physical connectors for different functions, including a first connector for providing power to the battery 280 and a second connector for providing communication with processor 220. In some embodiments, memory 240 is a non-volatile computer-readable medium in which information can be stored and/or accessed by other components of the recording device 200. Some non-limiting examples of a non-volatile computer-readable medium include flash memory and a magnetic hard drive. As shown, the memory 240 stores one or more machine learning models 250, 252, 254, media content 260, and one or more media files 270, 272.

A machine learning model comprises a set of computer-executable processing instructions and/or a set of parameters that may be used to process input data to generate output data. In some embodiments, a machine learning model 250, 252, 254 may be generated by processing training data associated with desired values to be generated. The processing of the training data may train or modify the processing instructions and/or the parameters to particularly generate the desired values upon detection of specific data in input data. As part of the training, the processing instructions and/or parameters may be improved or optimized to increase correlation between particular input data and the desired output values. Prior to training, a machine learning model may not generate the desired values to be generated or, alternately, generate output values with a lower degree of accuracy relative to the specific data in the input data. Once trained, the machine learning model 250, 252, 254 may generate the desired values for new input data. The machine learning model may be stored in a file. The machine learning model may also be stored as another discrete set of data, applicable by processor 220 to the new input data. The model output values may include one or more of a classification value, an estimate value, and/or a grouping value.

A machine learning model configured to provide a classification value may be considered a classifier. A classifier may receive input data and indicate the presence of one or more sets or classification associated with the input data. A label for the set or classification label may be predetermined for the classifier and applied, as appropriate to input data. A classifier may be implemented in the form of a convolutional neural network, a recurrent neural network, a general adversarial network, and/or a long short term memory network. A classifier may also be implemented in the form of a perceptron or other form of linear classification approach. The classifier may also or alternately involve a deep learning architecture. A classifier may receive input data and make decisions about whether to associate one or more labels with the input data based on values of the input data. The classifier may provide such labels as desired output value(s). The output values may be generated by the classifier at least in part based on training data applied to the classifier prior to storage of the classifier as a machine learning model for use on a recording device.

Other types of machine learning models may also be employed. The other types of models may be configured to include regression models, which may provide estimate values as output values. Machine learning models may also be configured to implement clustering models, which provide indications of cluster or grouping values, where the grouping values are not predetermined.

In some embodiments, the machine learning model 250, 252, 254 may include steps for extracting features from input data, and may include parameters that are learned during training that correlate the extracted features with the desired output data. Extracting features during the application of a machine learning model to new input data may require that additional space be provided in memory 240 for storage of data related the extracted features. Other steps of an applied machine learning model may also require additional space for data generated these steps. The generated data may be used as input data for subsequent steps in the machine learning model being applied. The additional space in memory 240 may only be required temporarily for an applied machine learning model.

In some embodiments, a machine learning model may be generated on a first computing system, but then stored and executed on other computing devices. The other computing devices may use the machine learning model without further input from the first computing system. For example, the first computing system may generate machine learning model 250, which may be then stored on each of recording devices 110, 120, 130, and 140. The machine learning model 250 may be stored on the recording devices by an original equipment manufacturer system, for example. The machine learning models 250, 252, 254 may not change after being stored on a recording device. In some embodiments, a stored machine learning model may be updated by a second computing device, such as computer 190, but will not be modified without the interaction of a second computing device, separate from the one on which the machine learning model is stored. Alternately, the models initially installed on a recording device may be adaptive, such that the processing instructions that form the model may be adaptive and include processing instructions to change the model after processing new input data.

In some embodiments, the machine learning models 250, 252, 254 may be associated with different tasks. For example, a first machine learning model 250 may be trained to locate faces in video, a second machine learning model 252 may be trained to detect license plates in video, and a third machine learning model 252 may be trained to convert speech to text in order to create a transcript of video.

In some embodiments, the machine learning models 250, 252, 254 may be associated with the same task, but be trained to generate different categories of desired values. Such models may be considered classifiers. For example, each of models 250, 252, and 254 may be trained to locate vehicles or cars in video content, but model 250 may generate desired values associated with red cars depicted in the video content, model 252 may generate desired values associated with grey cars depicted in the video content, and model 254 may generate desired values associated with blue cars depicted in the video content. Other categories are also possible, including models for detecting different kinds of weapons (e.g., guns, knives, conducted electrical weapons) and different kinds of motions (e.g., running, walking, stationary) among others. The models may also be configured and trained to detect different classifications for input data, such as a first model that detects cars, a second model that detects trucks, and a third model which detects motorcycles. The different classifications may be related, such as types of vehicles in the immediate example, or they may be unrelated to each other in terms of the classification or categories of desired values they provide.

As shown, the memory 240 also stores one or more media files 270, 272, which are described in further detail below. Briefly, the media files 270, 272 may store media content such as video, audio, biometric information, or any other information generated by a sensor. The sensor that generated the content in these media files 270, 272 may be the sensor 210 on the same recording device 200 in which memory 240 is provided.

Memory 240 may also store media content 260. This media content 260 may include various information, such as video, audio, biometric information, or any other information generated by a sensor. The sensor that generated the content in the media content 260 may be a sensor 210 on a different recording device and transferred to recording device 200 for processing as described further below in association with FIG. 4. The media content 260 may be stored separately from a media file 270 or a standard file format for the recording device 200 when it is generated by a different recording device on which it is stored. The media content 260 includes less than all of the media content of a source media file from what it was provided. The media content 260 may be copied from a separate recording device. The separate recording device may be a source of a media file with which the media content 260 is associated. Both recording device 200 on which the media content 260 is stored may and the source recording device from which the media content 260 was received may store a copy of the media content 260, though such media content in the source recording device may be retained as part of a media file, rather than separately stored media content.

In many embodiments, memory 240 stores one or more machine learning models 250, 252, 254 prior to storing either the media content 260 or the one or more media files 270 and 272. For example, at the beginning of a shift, recording device 200 may not have any media files stored thereon because all previous media files were previously offloaded from the recording device 200 and subsequently deleted from recording device 200. A machine learning model 250 may be permanently or semi-permanently stored in memory 240, such that the model was stored on memory 240 prior to the storages of the offloaded media files, as well as any media files that will be recorded during a shift or other session of use for the recording device 200 that is just beginning.

In many embodiments, memory 240 also stores one or more machine learning models 250, 252, 254 prior to receiving content 260 generated by a sensor such as a sensor from a different recording device, separate from recording device 200. Again, such models 250, 252, 254 may be permanently or semi-permanently stored on recording device 200 such that, if media content 260 from another recording device becomes available for processing, recording device 200 is able to receive this content 260 and perform distributed and/or parallel processing as further discussed below. Such an arrangement, where a model 250 is stored on a recording device prior to media content 260 or a media file 270 enables the recording device 200 to assist or perform distributed machine learning model processing without the need to access such a model from a different device—including a different device that may or may not be available via a network.

As shown, the components of the recording device 200 may be connected by a bus 292. The bus 292 may provide communication between the components of the recording device 200. The bus 292 may also provide power from the battery 280 to the other components of the recording device, and/or from the network interface 290 to the battery 280. While shown as a single element in FIG. 2, multiple such elements may be included in recording device 200, including those that interconnect less than all of the depicted components. For example, bus 292 may include a dedicated, electrical communication path between battery 280 and interface 290. Similarly, bus 292 may include a direct electrical signal path between sensor 210 and processor 220. The bus 292 may be implemented on a printed circuit board, which may provide one or more electrical connections between each component and one or more of the other components in FIG. 2.

Figure 3:
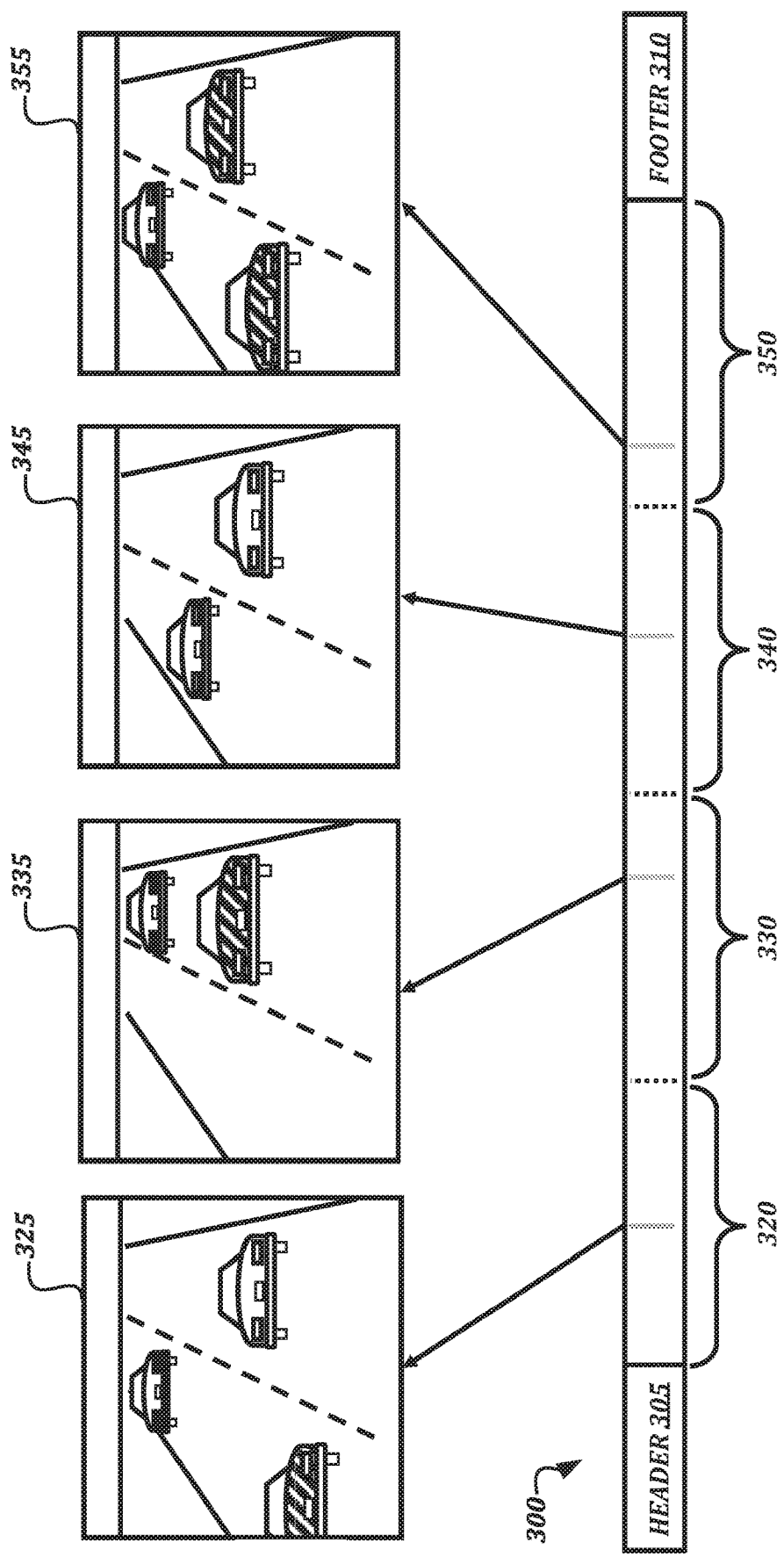
FIG. 3 is a schematic diagram that illustrates an example embodiment of a media file according to various aspects of the present disclosure.

FIG. 3 is a schematic diagram that illustrates an example embodiment of a media file according to various aspects of the present disclosure. As discussed elsewhere herein, the media file 300 is an example of a media file that may be generated by a recording device 200 and stored in the memory 240 of the recording device 200. As shown, the media file 300 comprises a file header 305 and media content 320, 330, 340, 350. The file header 305 may include data that identifies or describes the media file 300. Such data may include information including, but not limited to, a file name, an identifier of a recording device 200 on which the file was generated, when the file was generated, a file type, and/or a format of the media content. Such data may be provided at the start of the media file as stored and/or transmitted, but may also or additionally be included at the end of the file in a file footer 310. In some instances, file header data may also or alternately be interspersed as metadata within the media content 320, 330, 340, 350. In some instances, file 300 may not include file footer 310 or may simply include an end of file marker. Generally speaking, a media file includes data related to media content and data corresponding metadata. This data may be provided in various formats, aside from that which is depicted in FIG. 3. The exact format of a file may be determined in accordance with one or more standards for media files, including those developed by the MOTION PICTURE EXPERTS GROUP (MPEG), such as MPEG-H Part 2.

The media content 320, 330, 340, 350 includes audio data, image data, video data, and/or other types of information for the media file 300 recorded by the recording device 200 after being captured by a sensor, such as sensor 210. In some embodiments, the media content 320, 330, 340, 350 may be provided as a frame or sequence of frames. Some non-limiting examples of frames are illustrated as frames 325, 335, 345, 355. The media content 320, 330, 340, 350 may be captured in a single, continuous recording session between a start of data recording and a conclusion of the data recording by the recording device 200. The media content 320, 330, 340, and 350 may include all content data captured during the recording session. The continuous recording session may not be interrupted by another start or conclusion of data recording during the generation of media file 300. An individual frame may include data for reproducing an audible and/or visual signal captured by a sensor 210 at a given point in time. Video data may include sequential frames or sets of image data. Each set of image data may include matrices of pixel data, each having one or more pixel values.

The media content 320, 330, 340, 350 from a given media file 300 may be divided for distributed and/or parallel processing as discussed further herein. Dividing the media content 320, 330, 340, 350 may involve separating frames of media content according to time. For example, for media content 320, 330, 340, 350 that was captured by an input sensor and recorded over a period of forty seconds in length, four portions of media content may be generated by separating the first ten seconds of data into a first portion of media content 320, the next ten seconds of data into a second portion of media content 330, the next ten seconds of data into a third portion of media content 340, and the last ten seconds of data into a fourth portion of media content 350. The portions of media content may be from the same media file as shown in FIG. 3.

Other lengths and manners of separating media content are also contemplated. For example, in some embodiments, a machine learning model may be used that utilizes leading and trailing frames in order to track objects within a portion of media content. In such embodiments, the portions of media content may overlap such that a first portion of media content 320 also includes trailing frames from the start of the second portion of media content 330, and the second portion of media content 330 also includes leading frames from the end of the first portion of media content 320.

In some embodiments, the separated portions of media content may include different information. For example, a media file may include video information or video content as well as audio information or audio content. The media content may be divided according to media content type. A first machine learning model on a first recording device may then process a first type of content as a first portion while a second machine learning model on a second machine learning model may process a second type of content as a second portion. The first portion may be video content and the second portion may be audio content, for example. The first portion of content may only be processed on the first recording device, while the different, second portion of content may only be processed on the second recording device. Different combinations are also possible, including those that involve other types of information discussed above.

In other embodiments, the portions of media content may be the same and overlap completely. Such embodiments may be applicable where different machine learning models are available on different cameras. Copy of a same portion of media content may be retained or received by each recording device, enabling each recording device to subsequently generate different metadata for the same content using the different machine learning models on each respective recording device. The different sets of metadata may include different output values, depending on the task, action, category, or purpose associated with the different machine learning model to which the copy of the portion of the media content is applied. Yet, in other embodiments, the media content may be divided in a manner than includes no overlap of media content between the portions of media content retained or received by each recording device in the system. The portions processed by recording devices may also include all, or less than all, media content stored within a media file.

In some embodiments, the portions of media content may be sized in terms of their respective quantities of data, such that an equal amount of data for the media content may be provided to each recording device available to process media content. For example, if the overall size of the media content for file 300 is 800 megabytes, each of the content 320, 330, 340, and 350 may be 200 megabytes in size. Other sizes are possible depending on the size of the overall media content from a file to be processed, as well as the number of recording devices determined to be available for processing the media content.

The sample frames 325, 335, 345, 355 shown in FIG. 3 help illustrate an example of functionality provided by various embodiments of the present disclosure. In the sample frames 325, 335, 345, 355, red cars are depicted as shaded, while cars of other colors are depicted as not shaded. A machine learning model may be trained to detect cars in media content, and to determine the color of the detected cars. The machine learning model may then be used to generate metadata that indicates a number of cars of a given color at given points within the media content. The number of cars in this example may represent the desired output value for the machine learning model. The desired output values in this metadata may not be determined, defined, or otherwise available at a recording device prior to the application of the machine learning model to the media content. For example, in frames 325 and 335, the machine learning model may be used to generate metadata indicating the presence of a single red car. In frame 345, the machine learning model may be used to generate metadata indicating the presence of zero red cars. In frame 355, the machine learning model may be used to generate metadata indicating the presence of two red cars.

The metadata may also indicate a location within a frame associated with each detected red car. The sample frames 325, 335, 345, and 355 indicate that the media content 320, 330, 340, and 350 include different content data and depict different numbers of a desired output value—in this example, the number of red car. The machine learning model may detect each instance of the desired output value on a frame-by-frame basis. The model may be applied anew to each frame and without prior knowledge of the data in the frame. In some embodiments, depending on the machine learning model, the desired output value may also be generated with or without data from an adjacent frame.

FIG. 3 also demonstrates examples of input data, such as frame 345, where a desired output value may be zero, null, or not generated, indicating that the value for which the machine learning model was trained was not detected in the given frame. Frame 355 indicates that multiple desired output values may be generated for a given frame representing the number and/or location of each of multiple objects of interest in a frame. Frames 325 and 335 also indicate that the machine learning models may detect a desired output value independent of a location of content data within a frame, whether it the data of interest is on the left side of the frame as shown in frame 325 or on the right side of the frame as shown in frame 335.

The example of FIG. 3 also demonstrates that a desired output value may be generated in a discontinuous manner over time and/or across frames. For example, each frame between frame 325 and 335 may depict a single red car, prior to a frame at or before frame 345 depicts zero cars and prior to a frame at or before 355 that depicts two red cars. The desired output values may be generated for each frame by machine learning models applied to media content from file 300 and the generated values may reflect a corresponding continuous or non-continuous set of desired output values for a sequence of frames.

Annotating each frame of a given media file with the desired output values provides various technical benefits, including the ability to subsequently search, access, and review frames of interest. For example, user with access to videos stored at devices 180 and/or 190 determines that a red car may be related to a criminal activity, the user can access media files such as file 300 based on the metadata for the file that includes the annotations from the applied machine learning model. The user can further access the specific frame in the file 300 for review without needing to access other frames, such as frame 345, that do not include the related annotation from the applied machine learning model. Such an arrangement expedites access to relevant frames, as well as decreases the load on various parts of the system 100 that would be otherwise necessary to access non-related files and/or non-related frames.

Figure 4:
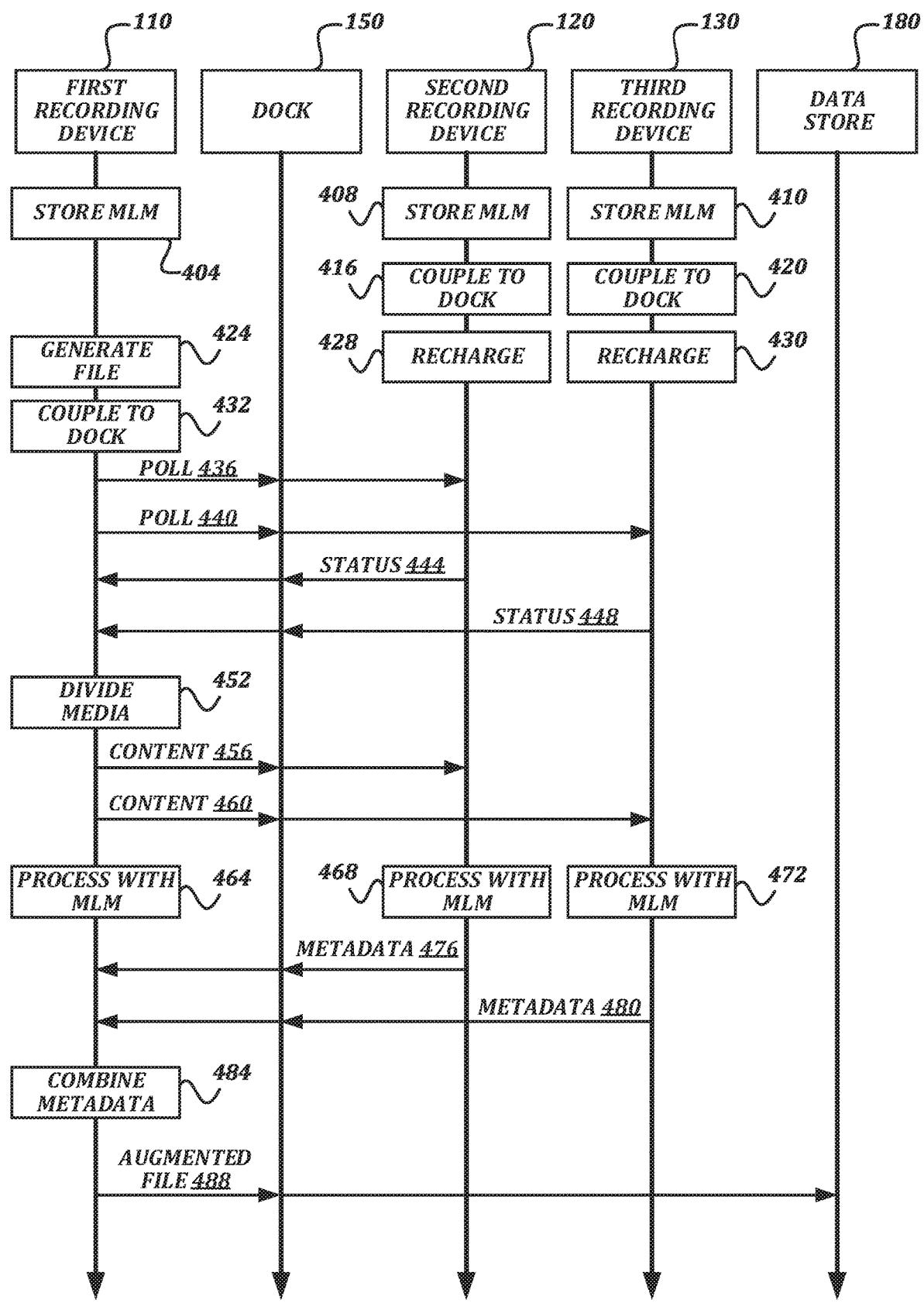
FIG. 4 is a sequence diagram of actions and communications in an example embodiment of a system according to various aspects of the present disclosure.

FIG. 4 is a sequence diagram of actions and communications in an example embodiment of a system according to various aspects of the present disclosure. In the sequence diagram, time is illustrated as proceeding in a downward direction, and arrows between the lines indicate communication between the components of the system 100. An arrow that crosses, but does not point to a given line indicates that the corresponding communication is not received by the device with the crossed line. For example, an augmented file at 488 is transmitted first to a dock 150 to a data store 180. This data transfer occurs between the dock 150 and data store 180 without the augmented file being received by either the second recording device 120 or the third recording device 130.

Further the time scale depicted in FIG. 4 may not be constant between events within a single device or between devices. For example, the recording devices 110, 120, 130 may store a machine learning model at the same time and/or in parallel. Alternately, point 408 may occur hours, days, or even months prior to point 404. In embodiments of the present disclosure, points may occur in parallel and/or at the same time relative to other events on the same device or a different device. Certain events may also occur before or after other events, particularly in a relative order between two devices. For example, point 424 may involve generating a file on device 110, before device 120 is coupled to dock at 416, despite the relative vertical position of these points in FIG. 4.

FIG. 4 also illustrates a system involving three recording devices 110, 120, 130, though embodiments of the system may include additional recording devices. Some embodiments may also involve fewer recording devices and not include, for example, a third recording device 130. Many embodiments will include multiple recording devices coupled to a same dock 150. Embodiments of the system need not include certain illustrated steps. Those shown in FIG. 4 are provided to illustrate one, non-limiting embodiment of a system and functions that may be performed by devices in such a system.

At point 404, the first recording device 110 stores at least one machine learning model, at point 408, the second recording device 120 stores at least one machine learning model, and at point 410, the third recording device 130 stores at least one machine learning model. Though illustrated as occurring at the same time, in some embodiments, the machine learning models may be stored on the first recording device 110, second recording device 120, and third recording device 130 at different times. As discussed above, the machine learning models may match each other. For example, the recording devices 110, 120, and 130 at each point 404, 406, and 408 may store a machine learning model trained to generate output values corresponding to a number of red cars depicted in input video data. Such machine learning models may be considered matching, due to the same or substantially similar types of output values that they provide (e.g., a number of red cars in this example). Alternately, each of the stored machine learning models may be different. Yet, each model, as shown in FIG. 4 is stored on a respective recording device prior to receipt of media content and/or generation of a media file.

At point 416, the second recording device 120 is coupled to the dock 150, and at point 420, the third recording device 130 is coupled to the dock 150. As noted above, point 416 may occur before or after point 420. After being coupled to the dock 150, the second recording device 120 recharges at point 428, and the third recording device 130 recharges at point 430. The recharging may continue past points 428 and 430 until the battery levels of the second recording device 120 and the third recording device 130 reach a battery level threshold.

At point 424, the first recording device 110 generates a media file, such as media file 300 illustrated and discussed above, and at point 432, the first recording device 110 is coupled to the dock 150. Though not illustrated, after being coupled to the dock 150, the first recording device 110 may also recharge its battery. The first recording device 110 may wait until its battery is recharged to a certain amount before performing subsequent actions as further discussed below. Alternately, the first recording device 110 may immediately initiate actions shown in FIG. 4 upon being coupled 432 to dock 150. At point 436, the first recording device 110 transmits a poll request to the second recording device 120 via the dock 150, and at point 440, the first recording device 110 transmits a poll request to the third recording device 130 via the dock 150. The poll request may comprise a single communication signal transmitted from the first recording device 110 to the second record device 120. The poll request may be transmitted via bus 160 of the dock 150, for example, as illustrated in FIG. 1. In some embodiments, the poll requests ask the second recording device 120 and the third recording device 130 for information regarding device status, including but not limited to battery level status, free storage space, stored machine learning models, and/or processor load information. At point 444, the second recording device 120 transmits a status notification to the first recording device 110 via the dock 150, and at point 448, the third recording device 130 transmits a status notification to the first recording device 110 via the dock 150. The status notifications are transmitted in response to the poll requests, and provide the information requested by the poll requests.

While illustrated as a single communication signals, the poll requests 436, 440 and status responses 444,448 may also comprise multiple communication signals and sequences of communication signals via the dock 150. For example, a first communication signal from the first recording device 110 may detect the presence and/or type of another recording device on the dock, while subsequent communication signals to this other recording device may request additional information, including the device status and other information noted above. Also, while FIG. 4 illustrates first recording device 110 as transmitting a request 436 and the second recording device transmitting a response 444, other embodiments may involve poll requests transmitted the second recording device 120 and status responses being sent by first recording device 110. Each recording device 110, 120, and 130 may send and/or poll requests and send and/or receive status responses.

At point 452, the first recording device 110 divides the media content into portions. As illustrated, the first recording device 110 has determined that the second recording device 120 and the third recording device 130 are available to process the media content based on the status notifications, and may divide the media content into three portions: one each to be processed by the first recording device 110, the second recording device 120, and the third recording device 130. In some embodiments, the first recording device 110 may determine that more or fewer recording devices are ready or appropriate for processing the media content, and so may divide the media content into more or fewer portions. The fewer recording devices may include less than all of the recording devices to which a poll request was transmitted and/or from which a status response was received by first recording device 110.

At point 456, the first recording device 110 transmits a first portion of media content to the second recording device 120 via the dock 150, and retains a second portion of media content. At point 460, the first recording device 110 transmits a third portion of media content to the third recording device 130 via the dock 150. Once received or retained, at point 464, the first recording device 110 processes the second portion of media content using a machine learning model. At point 468, the second recording device 120 processes the first portion of media content using a machine learning model. At point 472, the third recording device 130 processes the third portion of media content using a machine learning model. In some embodiments, the processing at points 464, 468, and 472 may overlap in time, such that the first recording device 110, the second recording device 120, and the third recording device 130 are processing portions of media content in parallel.

Parallel processing may allow for frames or content of a media file of the first recording device 110 to be processed out of order relative to the order in which the content was captured by the first recording device. For example, parallel processing may enable frame 355 in FIG. 3 to be process prior to frame 335, even though frame 335 was captured and stored generated first chronologically be a recording device. The metadata generated by processing frame 355 with a machine learning model may therefore be available before the corresponding metadata for frame 335, even though frame 355 appears at in at a later location in the sequence of media content included in file 300. One recording device may process media content 330 while another recording device processes media content 350.

Once the processing is completed by the second recording device 120, at point 476, the second recording device 120 transmits metadata generated for the first portion of media content to the first recording device 110 via the dock 150. Once the processing is completed by the third recording device 130, at point 480, the third recording device 130 transmits metadata generated for the third portion of media content to the first recording device 110 via the dock 150. At point 484, the first recording device 110 combines the metadata received from the second recording device 120 and the third recording device 130 with metadata generated by the first recording device 110. In some embodiments, the first recording device 110 adds the metadata to a header 305 or footer 310 of the media file 300 to create an augmented media file. In some embodiments, the first recording device 110 adds the metadata to a separate file to accompany the media file 300 in order to create an augmented media file. In some embodiments, the first recording device 110 adds the metadata to other locations in the file, including locations that may be interspersed or interleaved with content data in the media file 300.

Depending on various factors, point 476 may occur before or after point 480. For example, recording device 130 may have a faster processor than the second recording device 120, enabling recording device 130 to generate the metadata using a machine learning model faster than the second recording device 120. The first recording device 110 may also combine 484 the metadata with the media file upon receipt or generation of each set of metadata. For example, metadata generated by the first recording device 110 may be combined with a media file that was the source of the media content for which the metadata was generated at 464, prior to receipt of metadata at points 476 and 478. The metadata may be combined with a media file at point 484 in series, depending upon the order in which the metadata is available to the first recording device 110. In other embodiments, the first recording device 110 may wait until all generated metadata is available at the first recording device 110 prior to combining the metadata with the file at point 484.

At point 488, the first recording device 110 transmits the augmented file 488 to a data store 180 via the dock 150. Such transmission may include use of external connector 162 and/or network 170 as illustrated in FIG. 1.

In other embodiments (not shown), the metadata may be transmitted via dock 150 to a data store 180, rather than being transmitted by second and third recording devices 120,130 to the first recording device 110. In such embodiments, the first recording device 110 also uploads the media file associated with the media content to the data store 180, along with metadata generated by the first recording device 110. The data store 180 may receive the metadata from each recording device 110, 120, 130 and combine the metadata with a corresponding media file to generate an augmented media file at the data store 180. In such embodiments, the generated metadata may not be transferred back to a source recording device, such as first recording device 110 in the illustrated example.

Figure 5A:
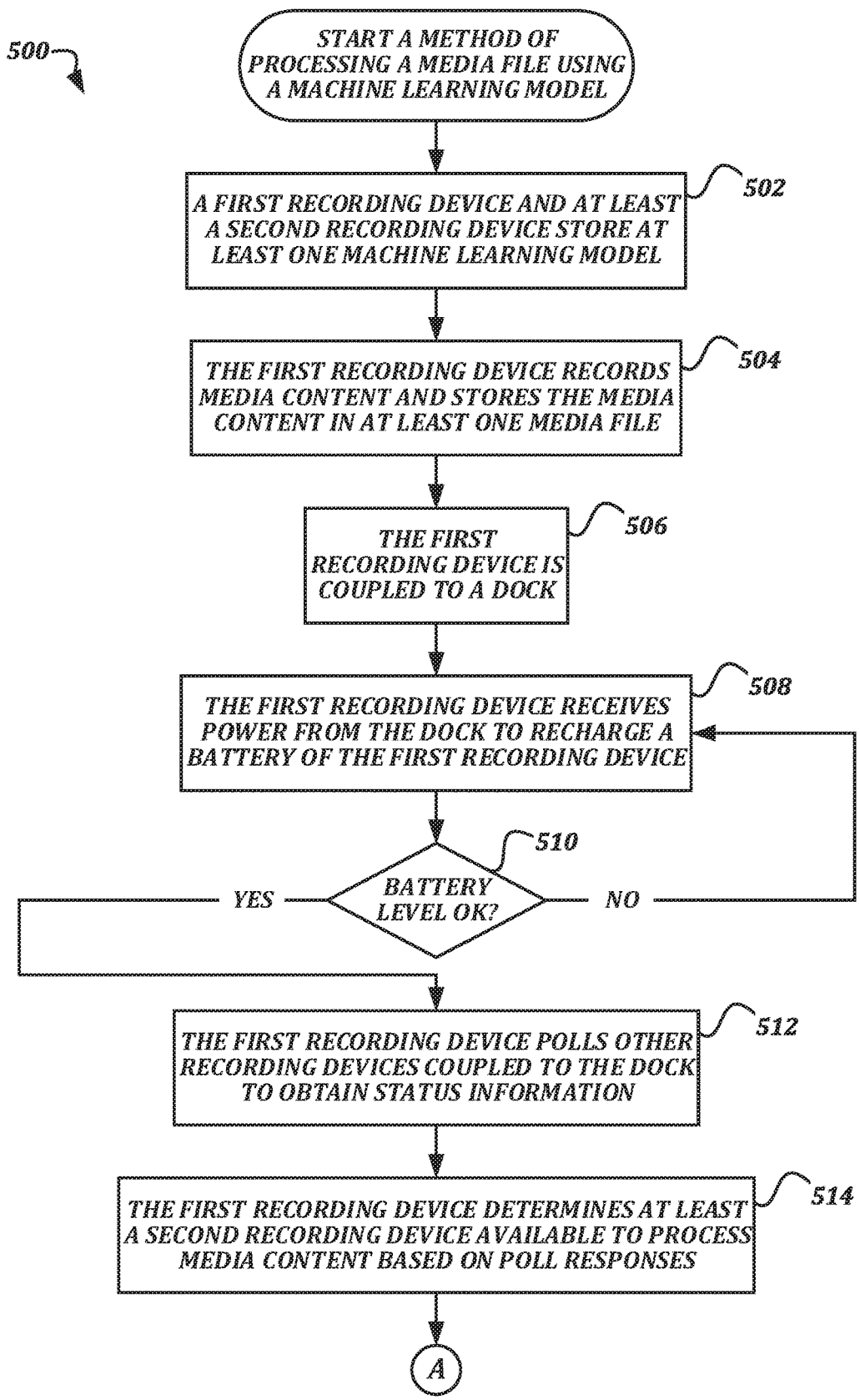
FIGS. 5A-5B are a flowchart that illustrates an example embodiment of a method of processing media using a machine learning model according to various aspects of the present disclosure.
Figure 5B:
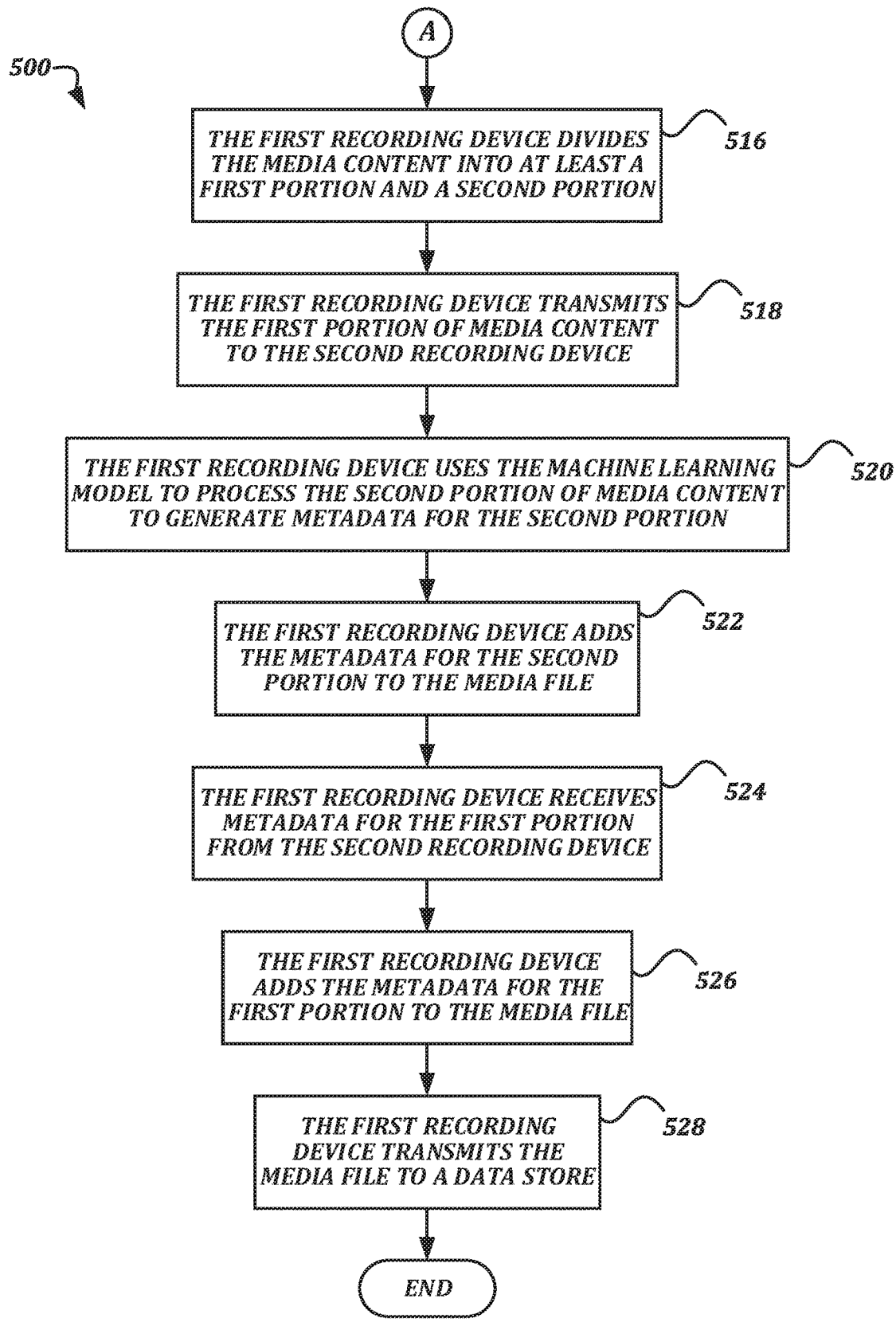

FIGS. 5A-5B are a flowchart that illustrates an example embodiment of a method of processing media using a machine learning model according to various aspects of the present disclosure. At a high level, the method 500 involves a first recording device 110 dividing media content that it had recorded into portions, and transmitting at least one portion of media of content to another recording device for processing using a machine learning model.

From a start block, the method 500 proceeds to block 502, where a first recording device 110 and at least a second recording device 120 store at least one machine learning model. In some embodiments, the at least one machine learning model stored on each of the recording devices 110, 120 may match each other. Matching machine learning models may be the same machine learning model, or may be different machine learning models that nonetheless generate similar metadata. For example, two different machine learning models that generate the same values or an overlapping set of values in metadata may be considered to match each other. In some embodiments, the at least one machine learning model stored on each of the recording devices 110, 120 may not match each other. For example, a machine learning model stored on the first recording device 110 may perform a different task and/or generate a different type of metadata than a machine learning model stored on the second recording device 120.

At block 504, the first recording device 110 records media content and stores the media content in at least one media file. The media content may be recorded during a law enforcement activity and/or associated with an incident. In some embodiments, a second recording device or other recording device may not be at the same incident or involved with the same activity. The media content may be recorded independent of whether another recording device is at the same incident or involved with the same activity. The media content may depict information that is only recorded by the first recording device without involvement of another recording device. As discussed above, the media content may be organized into a media file 270 in the memory 240.

At block 506, the first recording device 110 is coupled to a dock 150. Next, at block 508, the first recording device 110 receives power from the dock 150 to recharge a battery 280 of the first recording device 110. The method 500 then proceeds to a decision block 510, where a determination is made regarding whether a level of charge of the battery 280 is greater than or equal to a minimum charge threshold. As stated above, in some embodiments, the recording devices 110, 120 may be used continually during a work shift, and may need to be available for a work shift the next day. Accordingly, the first priority for providing power from the dock 150 upon coupling may be to recharge the battery 280 so that the recording device 110, 120 will be ready for use the next day, and providing power for energy-intensive processing such as the use of the machine learning models is a lower priority until a minimum acceptable charge level is reached. In some embodiments, the minimum charge threshold may be a fully charged state. In some embodiments, the minimum charge threshold may be less than fully charged, but may be determined in order to allow the battery 280 to reach a fully charged state by the time it is expected to be removed from the dock 150 while also providing power to the processor 220 for using the machine learning model. As examples, the threshold may include one of ninety percent and a seventy-five percent of total battery charge.

If the level of charge of the battery 280 is not greater than or equal to the minimum charge threshold, then the result of decision block 510 is NO, and the method 500 returns to block 508 for further charging before proceeding. Otherwise, if the level of charge of the battery 280 is greater than or equal to the minimum charge threshold, then the result of decision block 510 is YES, and the method 500 proceeds to block 512. In other embodiments, the decision at block 510 may be optional and allow for subsequent steps to be initiated independent of a charge level of the recording device. These embodiments may alternately require that power from an external source be provided to the recording device, independent of a state of the battery of the recording device. Such embodiments expedite processing of the media content in a media file, which may be important in the technical content of recording devices for law enforcement, where access to metadata from a processed media file can impact the usefulness of the device, the effectiveness of a recording device user, and the safety or security of a person or place that may be associated with an incident or law enforcement activity.

At block 512, the first recording device 110 polls other recording devices coupled to the dock 150 (including the second recording device 120) to obtain status information. In some embodiments, polling may include transmitting separate requests to each other recording device, and receiving status information from the other recording devices in response. In some embodiments, the first recording device 110 may poll by sending a single broadcast message requesting statuses of any other recording devices coupled to the dock 150, and the other recording devices coupled to the dock 150 may each receive the single broadcast message and respond with status information. In some embodiments, the first recording device 110 may poll by transmitting a request for status information to the dock 150, and the dock 150 may collect information from other recording devices and transmit it to the first recording device 110. In some embodiments, the status information may include one or more of a battery level of the recording device, an identification of one or more machine learning models stored on the recording device, amount of free storage space available in the memory of the recording device, and a current processor load of the recording device. The status information may also indicate a type of the polled recording device, including whether the polled recording device is one of a still camera, video camera, bodycam, vehicular camera, infrared camera, digital audio recorders, or other mobile computing device.

The method 500 then proceeds to block 514, where the first recording device 110 determines at least a second recording device 120 available to process media content based on poll responses. In some embodiments, the recording device determined to be available may be chosen based on one or more of the battery levels, the amounts of free storage space, the current processor load, the availability of a desired machine learning model, or using any other status information. The status information may be required to indicate that the second recording device 120 meet certain minimum requirements, such as a minimum about of battery level, a minimum amount of free storage space, a predetermined recording device type, or have a predetermined machine learning model, in order to be determined by the first recording device to be available by the first recording device. Such requirements may be stored in memory 240 of the first recording device prior to the polling at block 512 or prior to another step in the operation of the first recording device 110. Based on such requirements, a recording device may not be determined to be available, even if it provides status information to the first recording device. The second recording device 120 is described in the method 500 as being determined to be available for ease of discussion only. One will recognize that in some embodiments, a different recording device coupled to the dock 150, such as third recording device 130, or more than one recording device, could be determined. The method 500 then proceeds to a continuation terminal ("terminal A").

From terminal A (FIG. 5B), the method 500 proceeds to block 516, where the first recording device 110 divides the media content into at least a first portion and a second portion. A non-limiting example of dividing the media content into portions of media content was provided above with respect to FIG. 3. At block 518, the first recording device 110 transmits the first portion of media content to the second recording device 120. Once the second recording device 120 receives the first portion of media content, the second recording device 120 uses the stored machine learning model to process the first portion of media content and generate metadata. In some embodiments, the second recording device may use a method such as method 600 illustrated in FIGS. 6A-6B and described below to receive and process the first portion of media content.

At block 520, the first recording device 110 uses the machine learning model to process the second portion of media content to generate metadata for the second portion. In some embodiments, the machine learning model may implement any suitable technique to process media content to generate metadata. These techniques may include, but are not limited to, extracting features from pixel information of frames of the media content, processing the extracted features using one or more models such as a neural network or a K-means clustering technique, and combining outputs of the one or more models in order to generate the metadata.

This metadata is generated at the first recording device 110. The first recording device 110 is the source of the metadata, the first computing device on which the metadata is created. The metadata may include information, data, and/or values that were not identified, isolated, or otherwise included in the media file from which the second portion of media content was provided. The generated metadata may not be previously available on a separate recording device. The metadata may be generated independent of or without the involvement of another computing device, aside from the recording device on which the machine learning model processes the second portion of media content to generate the metadata. Metadata, once generated, may be transmitted to and/or received from another device, but the generation of the metadata remains dependent on the application of the machine learning model to media content at a given recording device. Similarly, the metadata may be based on media content received from and/or transmitted to another computing device, but again, the generation of the metadata remains dependent on the application of the machine learning model to the media content and the recording device on which the machine learning model is stored.

The metadata may also be generated independent of or without a signal from a second sensor on the recording device, aside from a first sensor by which the media content was captured prior to application of the machine learning model. The metadata may be generated on a recording device independent of any signal from any sensor on the recording device if the recording device is generating the metadata based on media content received from another recording device. For example, FIGS. 5 and 6 illustrate an example implementation in which a second recording device generates metadata for a first portion of content without the use of the image sensor on the second recording device.

Selection of technique for application at block 520 may be made based on the type of media being processed. For example, different machine learning techniques may be used to extract information from different types of media content. For example, convolutional neural nets may be selected to process image data or video data. Recursive neural networks may be used for processing audio data, such as to generate a transcription from the audio data. The technique applied by the machine learning model may be determined prior to storage of the machine learning model on the first recording device 110. The machine learning model may be further trained to generate desired, particular output values prior to storage of the machine learning model on the first recording device 110. The output values may be generated as metadata for the corresponding media content to which the machine learning model was applied. As part of the training, a technique implemented by the machine learning model may be adjusted for application to a particular type of input media content. For example, the machine learning model may be adjusted to particularly work with input data from a particular type of a recording device, such as a bodycam or a vehicle-mounted camera. As part of the training, a technique implemented by the machine learning model may be enhanced to provide particular output values upon receipt of particular input data. For example, a machine learning model may be particularly trained to detect specific activities or objects that are specifically related to a law enforcement context, including weapons, types of motion, or the presence of other law enforcement equipment such as light bars and sirens. A machine learning model does not encompass all implementations of a technique; rather, it represents a specific implementation of such a technique, optimized to receive particular input data and/or provide particular output values as output data.

Next, at block 522, the first recording device 110 adds the metadata for the second portion of the media content to the media file. As discussed above with respect to FIG. 3, the metadata may be added to the media file using any suitable technique, including but not limited to adding it to the header 305 of the media file 300, adding it to the footer 310 of the media file 300, incorporating it into the media content 320, 330, 340, 350 of the media file 300, and storing it in a separate file that accompanies the media file 300. The file with the added metadata may be stored in an internal storage component of the recording device, such as memory 240.

At block 524, the first recording device 110 receives metadata for the first portion of media content from the second recording device 120. The second recording device 120 is the source of this metadata. At block 526, the first recording device 110 adds the metadata for the first portion to the media file. In some embodiments, the first recording device 110 adds the metadata in a technique similar to how the metadata for the second portion was added in block 522. In some embodiments wherein the portions of media content overlap in order to provide leading and/or trailing frame information to the machine learning model, the first recording device 110 may reconcile the metadata for the overlapping portions using any suitable technique, including but not limited to prioritizing the metadata generated for trailing frames, and discarding metadata from the overlapping portions.

The method 500 then proceeds to block 528, where the first recording device 110 transmits the media file to a data store 180. The description above of the method 500 assumes that, by block 528, metadata has been generated and received by the first recording device 110 for all portions of the media content. In some embodiments, if the media content was divided into more than two portions, the first recording device 110 may wait until metadata has been generated and/or received for all of the portions before transmitting the media file to the data store 180. In other embodiments, the first recording device may transmit 458 an augmented file after each and/or less than all set of generate metadata are received and combined with the media file.

The method 500 then proceeds to an end block and terminates.

In some embodiments, blocks 520-522 of the method 500 may be optional. In such embodiments, the second portion and/or other additional portions may also be sent to the second recording device 120, or to yet another recording device, such that the first recording device 110 does not itself process a portion of the media content. In some embodiments, processing of the first portion of media content (by the second recording device 120 or another device) and the second portion of media content (by the first recording device 110 or another device) may occur at least partially at the same time, such that the processing can be described as occurring in parallel. In some embodiments, portions of media content may be transmitted by the first recording device 110 to other recording devices for processing (such as described in blocks 512-518 and 524-526) before checking the battery status of the first recording device 110 (such as described in blocks 508-510). In such embodiments, the battery status check may be used to delay processor-intensive actions by the first recording device 110, such as the processing of the second portion of media content by the first recording device 110 (such as described in block 520).

Figure 6A:
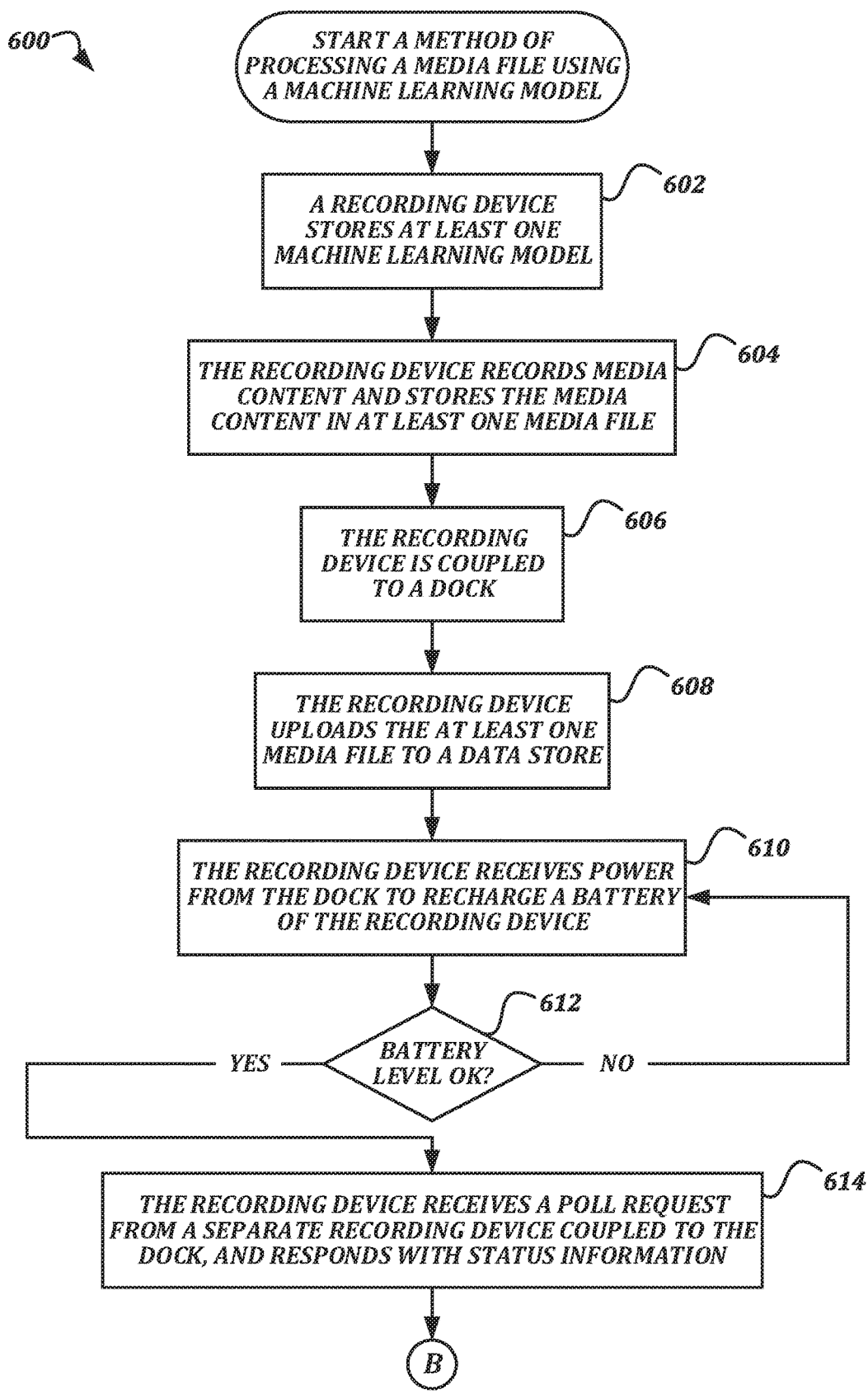
FIGS. 6A-6B are a flowchart that illustrates an example embodiment of a method of processing media using a machine learning model according to various aspects of the present disclosure.
Figure 6B:
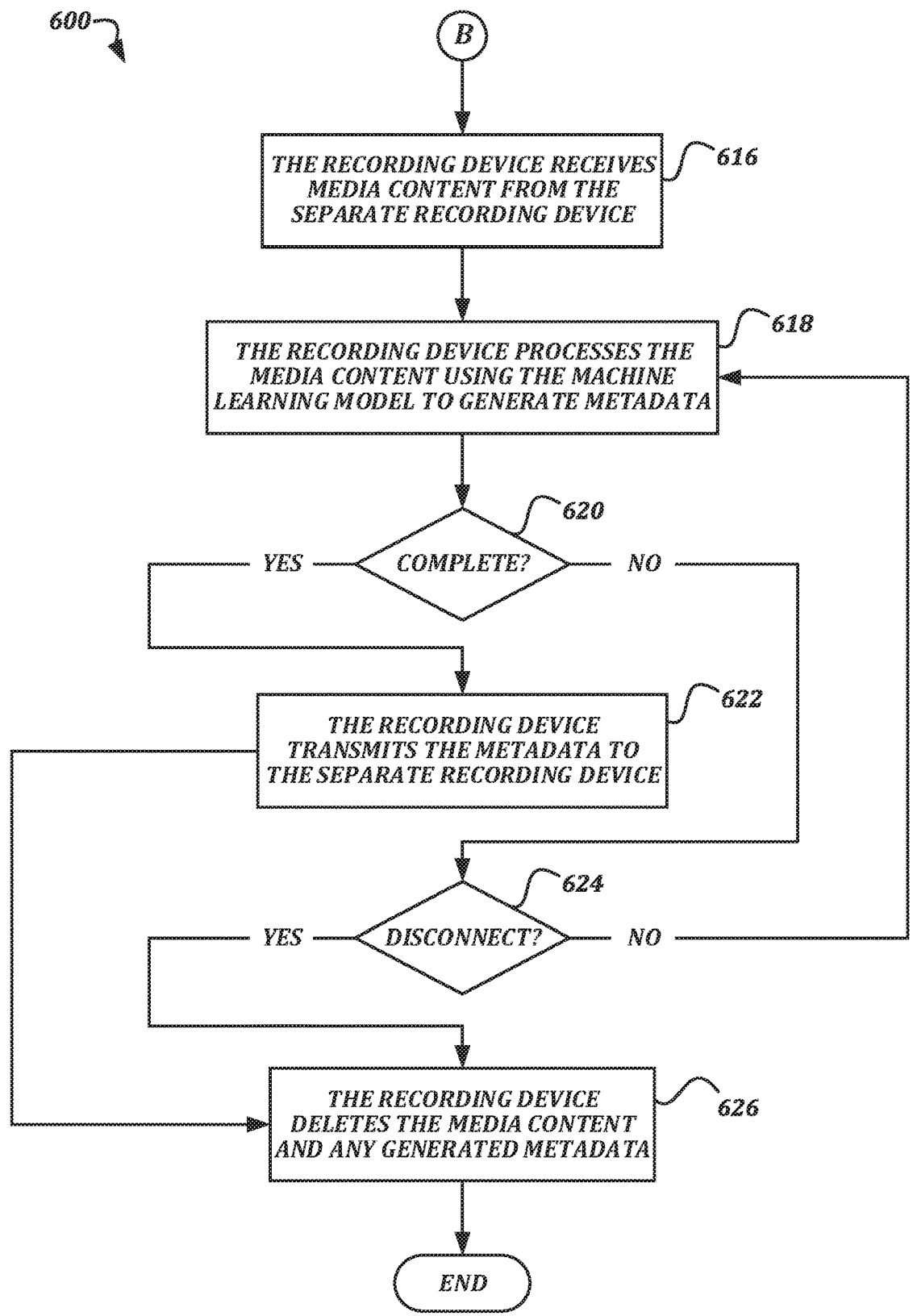

FIGS. 6A-6B are a flowchart that illustrates an example embodiment of a method of processing media using a machine learning model according to various aspects of the present disclosure. At a high level, the method 600 involves a recording device 200 (such as the second recording device 120) receiving a portion of media content from a separate recording device (such as the first recording device 110), processing the received portion of media content using a machine learning model to generate metadata, and transmitting the metadata back to the separate recording device. The method 600 will be described below as being performed primarily by the second recording device 120, but it should be understood that the method 600 could be performed by any recording device 200.

From a start block, the method 600 proceeds to block 602, where a recording device 120 stores at least one machine learning model. As discussed above, the recording device 120 could store more than one machine learning model, with each machine learning model performing a different action, being used for a different purpose, or being configured to generate output values for different tasks or categories. Further, the at least one machine learning model stored on a recording device could match machine learning models stored on other recording devices, or could be different from the machine learning models stored on other recording devices. The machine learning model may be stored on the second recording device 120 while media content and/or media files are not stored at the second recording device. For example, a machine learning model may be stored on the second recording device 120 prior to use of the second recording device in the field by an officer. In other embodiments, a machine learning model may be received and/or updated after one or more media files or media contents have been stored at recording device, but prior to the storage on the second recording device of one or more media files or media contents to which the machine learning model is subsequently applied. A machine learning model may also be received and/or updated prior to the storage on the second recording device prior to any media file or media content to which the machine learning model is subsequently applied.

At block 604, the recording device 120 records media content and stores the media content in at least one media file. Again, as discussed above, the media content may be recorded using the sensor 210 and stored in the memory 240. The recorded media content may be separate and distinct from the media content recorded at block 504. For example, the content recorded at block 604 may be recorded at a different event, different time, different place, and/or a different incident relative to the content recorded at block 504. It may also be recorded before or after the content recorded at block 504.

At block 606, the recording device 120 is coupled to a dock 150, and at block 608, the recording device 120 uploads the at least one media file to a data store 180. Before uploading the at least one media file, the recording device 120 may have generated (or may have caused to be generated) metadata for the at least one media file, by using a method such as method 500 discussed above. The recording device 120 may upload all media files stored on the recording device 120. This relative order of such steps prioritizes upload and processing of media files generated on a given recording device prior to the receipt and processing of media content from media files recorded on other recording devices. After uploading the at least one media file, the recording device 120 may delete the at least one media file from the memory 240 in order to create free space in the memory 240. The deletion may be optional and, for example, may allow the process to continue as long as the at least one media file has been uploaded by the recording device 120.

Next, at block 610, the recording device 120 receives power from the dock 150 to recharge a battery 280 of the recording device 120. Though illustrated as occurring at block 610, in some embodiments, the recording device 120 may have been receiving power to recharge the battery 280 continuously from the dock 150 after being coupled to the dock 150 at block 606. The method 600 then proceeds to a decision block 612, where a determination is made regarding whether a level of charge of the battery 280 is greater than or equal to a minimum charge threshold. As explained above in the description of method 500, the highest priority for the power received from the dock 150 may be to recharge the battery 280 to a level at which the recording device 120 can be used for an entire shift, and so the power-intensive processing of portions of media content may be delayed until the charge state of the battery 280 reaches that threshold.

If the level of charge of the battery 280 is not greater than or equal to the minimum charge threshold, then the result of decision block 612 is NO, and the method 600 returns to block 610 for further charging before proceeding. Otherwise, if the level of charge of the battery 280 is greater than or equal to the minimum charge threshold, then the result of decision block 612 is YES, and the method 600 proceeds to block 614.

At block 614, the recording device 120 receives a poll request from a separate recording device coupled to the dock 150 (such as recording device 110), and responds with status information. As discussed above, the status may include one or more of a battery level of the recording device, an identification of one or more machine learning models stored on the recording device, amount of free storage space available in the memory of the recording device, and a current processor load of the recording device. The status may also indicate a type of the polled recording device, including whether the polled recording device is one of a still camera, video camera, bodycam, vehicular camera, infrared camera, digital audio recorders, or other mobile computing device. In some embodiments, the recording device 120 may receive a poll request before block 614, and may either respond with level of charge information that indicates that the level of charge is less than the minimum charge threshold, or may simply not respond to the poll request until reaching block 614. In some embodiments, the minimum charge threshold associated with recording device 120 may be a same or different threshold employed by another recording device 110 to determine whether the recording device 120 is available for processing media content from the other recording device. Minimum charge threshold values may be independently set at each recording device. Each recording device may also have separate threshold values for determining whether the recording device is available for responding to a poll request by providing status information and/or determining whether another recording device is available for processing media content provided from the recording device.

The method 600 then proceeds to a continuation terminal ("terminal B"). From terminal B (FIG. 6B), the method 600 proceeds to block 616, where the recording device 120 receives media content from the separate recording device. In some embodiments, the recording device 120 may store the received media content in the memory 240 before processing the media content. At block 618, the recording device 120 processes the media content using the machine learning model to generate metadata. If multiple, different machine learning models are available on the recording device 120, an indication of a machine learning model to be applied by recording device 120 may be received with the media content from the other recording device 110. Alternately, such an indication may be provided as part of the poll request received at block 614. The processing performed at block 618 may be similar to the processing discussed above at block 520. The processing at block 618 results in the generation of metadata associated with the content received previously by recording device 120 at block 616.

While processing the media content, the method 600 may proceed to a decision block 620, where a determination is made regarding whether the processing of the media content is complete. If the processing of the media content is complete, then the result of decision block 620 is YES, and the method 600 proceeds to block 622, where the recording device 120 transmits the metadata to the separate recording device, and then to block 626. The metadata may be transmitted to the separate recording device without the corresponding media content previously received by the recording device 120 from recording device 110.

Otherwise, if the processing of the media content is not yet complete, then the result of decision block 620 is NO, and the method 600 proceeds to another decision block 624.

In some embodiments, it is possible that a user may wish to remove the recording device 120 from the dock 150 in order to use the recording device 120 to generate media content while it is still processing media content from other recording devices, since the processing of the media content from other recording devices is not the primary use of the recording device 120. Accordingly, at decision block 624, the recording device 120 is still processing the media content, and a determination is made regarding whether the recording device 120 has been disconnected from the dock 150. If the recording device 120 remains connected to the dock 150, then the result of decision block 624 is NO, and the method 600 returns to block 618 where processing of the media content continues. Otherwise, if the recording device 120 has been disconnected from the dock 150, then the result of decision block 624 is YES, and the method 600 proceeds to block 626. In embodiments, each recording device may only process media content with a machine learning model when the recording device is connected to a dock. When a recording device is disconnected from a dock, processing of media content may be prevented from starting or continuing in order to preserve battery for the recording device.

At block 626, the recording device 120 deletes the media content received from the separate recording device and any generated metadata associated with the media content received from the separate recording device. This deletion may help clear storage space in the memory 240 for new media files to be recorded by the recording device 120. The method 600 then proceeds to an end block and terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A distributed processing system, comprising:
   a dock;
   a first recording device removably coupled to the dock and including:
      a first sensor;

a first memory storing a first machine learning model and media content captured via the first sensor; and
a first processor configured to:
divide the media content into a first portion of the media content and a second portion of the media content, wherein the first portion of the media content and the second portion of the media content include separate frames of the media content;
transmit the first portion of the media content from the first recording device via the dock; and
responsive to dividing the media content, process the second portion of the media content using the first machine learning model; and
a second recording device removably coupled to the dock and including:
a second sensor;
a second memory storing a second machine learning model, wherein the second machine learning model and the first machine learning model generate same values or an overlapping set of values in metadata; and
a second processor configured to:
receive the first portion of the media content via the dock from the first recording device; and
process the received first portion of the media content using the second machine learning model.

2. The system of claim 1, wherein the second sensor includes at least one of an image sensor and a microphone.

3. The system of claim 1, wherein both the first recording device and the second recording device are body-worn cameras.

4. The system of claim 1, wherein the second machine learning model includes a convolutional neural network, a recurrent neural network, a general adversarial network, or a long short term memory network.

5. The system of claim 1, wherein the first machine learning model and the second machine learning model are the same machine learning model respectively stored in each of the first memory of the first recording device and the second memory of the second recording device.

6. The system of claim 5, wherein the second processor of the second recording device processes the first portion of the media content while the first processor of the first recording device processes the second portion of the media content.

7. The system of claim 1, wherein the media content is included in a media file and further includes a sequence of frames recorded by the first recording device.

8. The system of claim 7, wherein the first portion of the media content received by the second recording device includes a first subset of the sequence of frames from the media file.

9. The system of claim 8, wherein the first recording device retains a second subset of the sequence of frames from the media file as the second portion of the media content, the second portion separate from the first portion and not transmitted to the second recording device from the first recording device.

10. The system of claim 1, wherein processing the received first portion of the media content generates metadata associated with the first portion of the media content.

11. The system of claim 10, wherein the second processor of the second recording device is further configured to transmit the metadata to the first recording device via the dock.

12. The system of claim 1, further comprising:
a third recording device removably coupled to the dock, the third recording device including:
a third memory storing a third machine learning model; and
a third processor configured to:
receive a third portion of the media content via the dock from the first recording device; and
process the received third portion of the media content using the third machine learning model,
wherein the third portion of the media content received by the third recording device is different from the first portion of the media content received by the second recording device.

13. The system of claim 1, wherein the second processor is further configured to transmit a processed first portion of the media content to the first recording device, and wherein the first processor is further configured to generate, based on the processed first portion and a processed second portion of the media content, an augmented file of the media content.

14. The system of claim 1, wherein the first recording device and the second recording device are physically coupled to different bays of the dock at a same time.

15. A body-worn camera, comprising:
a sensor operable to capture first media content;
a memory storing a machine learning model and operable to store the first media content; and
a processor configured to:
store the first media content captured via the sensor in the memory;
receive second media content via a dock from a second body-worn camera;
process the second media content using the machine learning model to generate metadata; and
transmit the metadata from the body-worn camera via the dock wherein the second media content is different from the first media content.

16. The body-worn camera of claim 15, wherein the second media content includes a sequence of frames recorded by the second body-worn camera.

17. The body-worn camera of claim 15, wherein the processor is configured to transmit the metadata to the second body-worn camera via the dock.

18. A method of processing media content in a body-worn camera, the method comprising:
capturing first media content with a sensor of the body-worn camera;
storing the first media content in a memory of the body-worn camera;
storing a machine learning model in the memory of the body-worn camera;
processing the first media content using the machine learning model using a processor of the body-worn camera to generate first metadata;
receiving second media content from a separate recording device;
processing the second media content using the machine learning model using the processor of the body-worn camera to generate second metadata; and
transmitting the second metadata to the separate recording device.

19. The method of claim 18, wherein the second media content is received while both the body-worn camera and the separate recording device are coupled to a dock, and wherein the second metadata is transmitted to the separate recording device via the dock.

20. The method of claim 18, further comprising:
while the body-worn camera is recharging after being coupled to a dock, determining a battery level of the body-worn camera, wherein processing the second media content using the machine learning model is performed in response to determining that the battery level is equal or greater than a threshold level.

\* \* \* \* \*